(12) United States Patent
Takasu et al.

(10) Patent No.: US 10,991,174 B2
(45) Date of Patent: Apr. 27, 2021

(54) MACHINE LEARNING DEVICE OF AMOUNT OF UNBURNED FUEL, MACHINE LEARNING METHOD, LEARNED MODEL, ELECTRONIC CONTROL UNIT, METHOD OF PRODUCTION OF ELECTRONIC CONTROL UNIT, AND MACHINE LEARNING SYSTEM

(71) Applicant: TOYOTA JIDOSHA KABUSHIKI KAISHA, Toyota (JP)

(72) Inventors: Yusuke Takasu, Sunto-gun (JP); Hiroshi Oyagi, Gotemba (JP); Keisuke Nagasaka, Gotemba (JP); Tomohiro Kaneko, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 277 days.

(21) Appl. No.: 16/007,446

(22) Filed: Jun. 13, 2018

(65) Prior Publication Data

US 2019/0325671 A1    Oct. 24, 2019

(30) Foreign Application Priority Data

Apr. 20, 2018   (JP) .............................. JP2018-081365

(51) Int. Cl.
*G07C 5/08*   (2006.01)
*G06N 3/04*   (2006.01)
(Continued)

(52) U.S. Cl.
CPC ....... *G07C 5/0808* (2013.01); *F02D 41/1405* (2013.01); *F02D 41/1459* (2013.01);
(Continued)

(58) Field of Classification Search
CPC ... F02D 41/1458; F02D 41/2454–2461; F02B 77/086
See application file for complete search history.

(56) References Cited

U.S. PATENT DOCUMENTS 5,361,213 A * 11/1994 Fujieda ................. G01S 17/931
701/111
5,657,737 A * 8/1997 Ishida ................... F02D 41/047
123/674

(Continued)

FOREIGN PATENT DOCUMENTS

DE      10328015 A1 *  1/2005  ......... F02D 41/1473
JP      H11-85719 A    3/1999
(Continued)

*Primary Examiner* — John M Zaleskas
(74) *Attorney, Agent, or Firm* — Finnegan, Henderson, Farabow, Garrett & Dunner, LLP

(57) ABSTRACT

A machine learning device of an amount of unburned fuel using a neural network in which the correlation functions showing correlations between parameters and an amount of unburned fuel are found for parameters relating to operation of an internal combustion engine, and the parameters with strong degrees of correlation with the amount of unburned fuel exhausted from the engine are selected from among the parameters based on the correlation functions. The amount of unburned fuel is learned by using the neural network from the selected parameters and amount of unburned fuel.

7 Claims, 23 Drawing Sheets

(51) Int. Cl.
  *G06N 3/08* (2006.01)
  *F02D 41/14* (2006.01)
  *F02B 77/08* (2006.01)
  *G07C 5/00* (2006.01)
(52) U.S. Cl.
  CPC ............ *G06N 3/04* (2013.01); *G06N 3/0481* (2013.01); *G06N 3/084* (2013.01); *F02B 77/086* (2013.01); *G07C 5/008* (2013.01)

(56) References Cited

U.S. PATENT DOCUMENTS

| | | | | |
|---|---|---|---|---|
| 5,690,072 A * | 11/1997 | Meyer | ................ | F02D 41/1405 123/436 |
| 5,745,653 A * | 4/1998 | Jesion | ................ | F02D 41/1405 706/23 |
| 5,755,212 A * | 5/1998 | Ajima | ................ | F02D 41/1405 123/674 |
| 5,781,700 A * | 7/1998 | Puskorius | ........... | F02D 41/1405 706/14 |
| 5,806,013 A * | 9/1998 | Paielli | ................ | F02D 41/1405 701/106 |
| 5,915,359 A * | 6/1999 | Meyer | ................ | F02D 41/1405 123/436 |
| 5,915,368 A * | 6/1999 | Ishida | ................... | F02D 41/047 123/675 |
| 5,954,783 A * | 9/1999 | Yamaguchi | ........... | F02D 41/047 123/480 |
| 6,032,139 A * | 2/2000 | Yamaguchi | ......... | F02D 41/1401 706/13 |
| 6,064,996 A * | 5/2000 | Yamaguchi | ......... | F02D 41/1401 706/13 |
| 6,092,017 A * | 7/2000 | Ishida | ................ | F02D 41/1404 701/106 |
| 6,098,012 A * | 8/2000 | Stander | ................... | F02D 37/02 123/406.47 |
| 6,122,589 A * | 9/2000 | Yamaguchi | ........... | F02D 41/047 123/480 |
| 6,236,908 B1 * | 5/2001 | Cheng | ................ | F02D 41/0062 701/1 |
| 6,278,986 B1 * | 8/2001 | Kamihira | ............ | F02D 41/1401 701/101 |
| 6,289,275 B1 * | 9/2001 | Stander | ................... | F02D 37/02 701/104 |
| 6,330,553 B1 * | 12/2001 | Uchikawa | .......... | G05B 13/0285 706/2 |
| 6,349,293 B1 * | 2/2002 | Yamaguchi | ......... | F02D 41/1405 706/2 |
| 6,405,122 B1 * | 6/2002 | Yamaguchi | ......... | F02D 41/1404 701/106 |
| 2003/0093392 A1 * | 5/2003 | Ulyanov | ............ | G05B 13/0265 706/13 |
| 2003/0158709 A1 * | 8/2003 | Ishida | ................ | G05B 13/0285 702/189 |
| 2003/0187567 A1 * | 10/2003 | Sulatisky | ............ | F02D 19/081 701/104 |
| 2003/0216855 A1 | 11/2003 | Liang et al. | | |
| 2004/0084024 A1 * | 5/2004 | Malaczynski | ........... | G01L 23/22 123/435 |
| 2004/0230368 A1 * | 11/2004 | Kropinski | ........... | G05B 23/024 701/114 |
| 2005/0060990 A1 | 3/2005 | Ueno et al. | | |
| 2005/0211233 A1 * | 9/2005 | Moulin | ................ | F02D 41/1454 123/673 |
| 2006/0212209 A1 * | 9/2006 | Cesario | ............... | F02D 41/1405 701/106 |
| 2006/0225710 A1 * | 10/2006 | Taglialatela-Scafati | ..................... | F02D 41/18 123/486 |
| 2006/0229769 A1 * | 10/2006 | Grichnik | ................ | G05B 17/02 701/1 |
| 2007/0118338 A1 * | 5/2007 | Grichnik | ............. | F02D 41/1401 703/2 |
| 2007/0203864 A1 * | 8/2007 | Grichnik | ............. | F02D 41/1462 706/44 |
| 2007/0233326 A1 * | 10/2007 | Jayachandran | ..... | F02D 41/1405 701/1 |
| 2007/0265763 A1 * | 11/2007 | Akazaki | ............ | F02D 41/1458 701/103 |
| 2008/0040014 A1 * | 2/2008 | Yahata | .................... | F01N 9/002 701/99 |
| 2008/0140298 A1 | 6/2008 | Morimoto et al. | | |
| 2008/0201054 A1 * | 8/2008 | Grichnik | ............ | F02D 41/1462 701/102 |
| 2008/0312756 A1 * | 12/2008 | Grichnik | ............ | G05B 19/0423 700/29 |
| 2009/0005953 A1 * | 1/2009 | Cesario | ................ | G06K 9/6223 701/102 |
| 2009/0063087 A1 * | 3/2009 | Grichnik | ................ | G05B 17/02 702/127 |
| 2009/0063115 A1 * | 3/2009 | Lu | .......................... | G05B 17/02 703/8 |
| 2009/0112334 A1 * | 4/2009 | Grichnik | ................ | F02D 41/26 700/29 |
| 2009/0119065 A1 * | 5/2009 | Grichnik | ................ | G05B 17/02 702/182 |
| 2009/0192699 A1 * | 7/2009 | Bottcher | ............. | F02D 41/1405 701/108 |
| 2009/0300422 A1 * | 12/2009 | Grichnik | ............ | G05B 23/0283 714/37 |
| 2010/0050025 A1 * | 2/2010 | Grichnik | ................ | G05B 17/02 714/47.2 |
| 2010/0131181 A1 * | 5/2010 | Herrmann | ........... | F02D 41/0052 701/108 |
| 2011/0137541 A1 * | 6/2011 | Malikopoulos | ..... | F02D 41/2467 701/106 |
| 2011/0218727 A1 * | 9/2011 | Cesario | ................ | G06K 9/6223 701/103 |
| 2012/0014838 A1 * | 1/2012 | Yasui | ................. | F02D 41/0062 422/105 |
| 2012/0109500 A1 * | 5/2012 | Beer | .................... | F02D 41/2438 701/103 |
| 2012/0232772 A1 * | 9/2012 | Sun | ......................... | F02D 41/18 701/103 |
| 2012/0323343 A1 * | 12/2012 | Grichnik | ................ | G05B 17/02 700/30 |
| 2013/0111878 A1 * | 5/2013 | Pachner | .................. | F01N 9/002 60/274 |
| 2013/0158840 A1 * | 6/2013 | Lu | ......................... | G06K 9/6269 701/104 |
| 2013/0173028 A1 * | 7/2013 | Felty | ..................... | G05B 13/02 700/79 |
| 2013/0268177 A1 * | 10/2013 | Wu | ..................... | F02D 41/0085 701/103 |
| 2014/0012791 A1 * | 1/2014 | Grichnik | ................ | G06N 20/00 706/46 |
| 2015/0088398 A1 * | 3/2015 | Cui | ..................... | F02D 41/1448 701/101 |
| 2017/0218860 A1 * | 8/2017 | Pachner | ............. | F02D 41/1401 |
| 2019/0242318 A1 * | 8/2019 | Kitagawa | ................ | G06N 3/084 |
| 2019/0311262 A1 * | 10/2019 | Nagasaka | ................ | F01N 9/00 |

FOREIGN PATENT DOCUMENTS

| | | | | |
|---|---|---|---|---|
| JP | 2002-322938 A | 11/2002 | | |
| JP | 2003-328732 A | 11/2003 | | |
| JP | 2004239233 A * | 8/2004 | ........ | F02D 41/1473 |
| JP | 2005-113909 A | 4/2005 | | |
| JP | 2008-38822 A | 2/2008 | | |
| JP | 2008-144689 A | 6/2008 | | |
| WO | WO-9605421 A1 * | 2/1996 | ........ | F02D 41/2432 |
| WO | WO-9837321 A1 * | 8/1998 | ........ | F02D 41/1473 |

* cited by examiner

FIG. 8

| No | PARAMETER | PARAMETER VALUE | METHOD OF ACQUISITION |
|----|-----------|-----------------|----------------------|
| 1 | MAIN INJECTION AMOUNT | x1 | ECU COMMAND VALUE |
| 2 | MAIN INJECTION TIMING | x2 | ECU COMMAND VALUE |
| 3 | FIRST PILOT INJECTION AMOUNT | x3 | ECU COMMAND VALUE |
| 4 | FIRST PILOT INJECTION TIMING | x4 | ECU COMMAND VALUE |
| 5 | SECOND PILOT INJECTION AMOUNT | x5 | ECU COMMAND VALUE |
| 6 | SECOND PILOT INJECTION TIMING | x6 | ECU COMMAND VALUE |
| 7 | AFTER INJECTION AMOUNT | x7 | ECU COMMAND VALUE |
| 8 | AFTER INJECTION TIMING | x8 | ECU COMMAND VALUE |
| 9 | COMMON RAIL PRESSURE | x9 | OUTPUT VALUE OF FUEL PRESSURE SENSOR |
| 10 | ENGINE SPEED | x10 | CALCULATED VALUE AT ECU |
| 11 | INTAKE PRESSURE | x11 | OUTPUT VALUE OF INTAKE PRESSURE SENSOR |
| 12 | INTAKE TEMPERATURE | x12 | OUTPUT VALUE OF INTAKE TEMPERATURE SENSOR |
| 13 | ENGINE COOLING WATER TEMPERATURE | x13 | OUTPUT VALUE OF WATER TEMPERATURE SENSOR |
| 14 | EXHAUST PRESSURE | x14 | OUTPUT VALUE OF EXHAUST PRESSURE SENSOR |
| 15 | EGR RATE | x15 | CALCULATED VALUE AT ECU |
| 16 | SWIRL RATIO | x16 | DEMANDED OPENING DEGREE OF SWIRL CONTROL VALVE |
| 17 | UNBURNED FUEL AMOUNT | y | GAS ANALYSIS DEVICE OR HC CONCENTRATION SENSOR |

$f1(i) = a1 \cdot x1(i) + b1$ $fs(i) = as \cdot xs(i) + bs$

MACHINE LEARNING DEVICE OF AMOUNT OF UNBURNED FUEL, MACHINE LEARNING METHOD, LEARNED MODEL, ELECTRONIC CONTROL UNIT, METHOD OF PRODUCTION OF ELECTRONIC CONTROL UNIT, AND MACHINE LEARNING SYSTEM

FIELD

The present invention relates to a machine learning device of an amount of unburned fuel, a machine learning method, a learned model, an electronic control unit, a method of production of an electronic control unit, and a machine learning system.

BACKGROUND

Known in the art is an unburned fuel amount estimating device in which the amount of unburned fuel exhausted from an engine is stored in advance as a function of a demanded engine torque and engine speed in the form of a map and an estimated value of the amount of unburned fuel is found by correcting the amount of unburned fuel stored in the map based on an exhaust temperature (for example, see Japanese Patent Publication No. 2008-38822).

That is, if the amount of fuel made to burn in the supplied fuel is large, the exhaust temperature rises and the amount of unburned fuel exhausted from the engine is decreased. On the other hand, if the amount of fuel made to burn in the supplied fuel is small, the exhaust temperature falls and the amount of unburned fuel exhausted from the engine is increased. In this way, the amount of unburned fuel exhausted from the engine changes in accordance with the exhaust temperature. Therefore, in the above-mentioned unburned fuel amount estimating device, the estimated value of the amount of unburned fuel is found by correcting the amount of unburned fuel stored in the map based on the exhaust temperature.

SUMMARY

Technical Problem

However, the amount of unburned fuel exhausted from an engine also changes due to engine operating parameters other than the demanded engine torque, engine speed, and exhaust temperature. Therefore, even if finding an estimated value of the amount of unburned fuel by correcting the amount of unburned fuel stored in the map based on the exhaust temperature, it is not possible to find the amount of unburned fuel by a high estimation precision. Therefore, in the present invention, machine learning is used to predict the amount of unburned fuel by a high precision.

That is, in a first aspect of the present invention, there is provided a machine learning device of an amount of unburned fuel for performing a machine learning by using training data, wherein parameters with strong degrees of correlation with an amount of unburned fuel exhausted from an internal combustion engine are selected from among parameters relating to operation of the engine, and a machine learning for estimating an amount of unburned fuel is performed based on the selected parameters.

In a second aspect of the present invention, there is provided a machine learning device of an amount of unburned fuel, wherein parameters with strong degrees of correlation with an amount of unburned fuel exhausted from an internal combustion engine are selected from among parameters relating to operation of the engine, and a machine learning for estimating an amount of unburned fuel is performed based on the selected parameters by using a neural network.

In a third aspect of the present invention, there is provided a machine learning device of an amount of unburned fuel, provided with an electronic control unit, the electronic control unit comprising;
a parameter value acquiring unit for acquiring input data related to operation of an engine,
a processing unit for performing processing using a neural network comprised of an input layer, hidden layers, and an output layer, and
a storage unit, values of operating parameters of the engine being input to the input layer and an output value, which changes in accordance with the values of the operating parameters of the engine, being output from the output layer, wherein
an amount of unburned fuel exhausted from the engine, and parameters relating to the amount of unburned fuel are acquired by the parameter value acquiring unit,
a data set showing the relationship between the parameters acquired by the parameter value acquiring unit and the acquired amount of unburned fuel is stored in the storage unit,
parameters with strong degrees of correlation with the amount of unburned fuel are selected from among the parameters stored in the data set,
weights of a neural network are learned by the processing unit from the selected parameters and the amount of unburned fuel, and
the neural network with the learned weights is used to output an estimated value of the amount of unburned fuel corresponding to the parameters.

In a fourth aspect of the present invention, there is provided a machine learning method of an amount of unburned fuel using a neural network to predict an amount of unburned fuel, comprising the steps of:
selecting parameters with strong degrees of correlation with the amount of unburned fuel exhausted from an internal combustion engine from among parameters related to the operation of the engine,
learning weights of the neural network based on a data set showing the relationship of the selected parameters and the amount of unburned fuel by using the selected parameters as input parameters of the neural network and using the amount of unburned fuel as training data, and
estimating the amount of unburned fuel by using the learned neural network.

In a fifth aspect of the present invention, there is provided a learned model for predicting an amount of unburned fuel by using a neural network, which is generated by
selecting parameters with strong degrees of correlation with the amount of unburned fuel exhausted from an internal combustion engine from among parameters related to the operation of the engine, and
learning weights of the neural network based on a data set showing the relationship of the selected parameters and the amount of unburned fuel by using the selected parameters as input parameters of the neural network and using the amount of unburned fuel as training data.

In a sixth aspect of the present invention, there is provided an electronic control unit for using a neural network to predict an amount of unburned fuel, which electronic control unit has built into it a learned model which is generated by selecting parameters with strong degrees of correlation with the amount of unburned fuel exhausted from an internal combustion engine from among parameters related to the operation of the engine, and learning weights of the neural network based on a data set showing the relationship of the selected parameters and the amount of unburned fuel by using the selected parameters as input parameters of the neural network and using the amount of unburned fuel as training data.

In a seventh aspect of the present invention, there is provided a method of production of an electronic control unit for producing an electronic unit using a neural network to predict an amount of unburned fuel by incorporating a learned neural network inside it as a learned model, the learned neural network being generated by selecting parameters with strong degrees of correlation with the amount of unburned fuel exhausted from an internal combustion engine from among parameters related to the operation of the engine, and learning weights of the neural network based on a data set showing the relationship of the selected parameters and the amount of unburned fuel by using the selected parameters as input parameters of the neural network and using the amount of unburned fuel as training data.

In a eighth aspect of the present invention, there is provided a machine learning system for using a neural network to predict an amount of unburned fuel, the machine learning system comprising:

a parameter value acquiring unit for acquiring an amount of unburned fuel exhausted from an engine and parameters relating to the amount of unburned fuel, a storage unit for storing a data set showing the relationship between the parameters and amount of unburned fuel which are acquired by the parameter value acquiring unit, a parameter selecting unit for selecting parameters with strong degrees of correlation with the amount of unburned fuel from among the parameters stored in the data set, and a learning unit for learning weights of the neural network from the selected parameters and amount of unburned fuel.

In a ninth aspect of the present invention, there is provided a vehicle-mounted electronic control unit, wherein data showing an amount of unburned fuel exhausted from an engine and values of parameters relating to an amount of unburned fuel is acquired in a vehicle, the data is transmitted to a server, parameters with strong degrees of correlation with the amount of unburned fuel exhausted from the engine are selected from among the received parameters at the server, a learned model is generated in the server by using the selected parameters and amount of unburned fuel to learn weights of a neural network, and generate a learned model, the generated learned model is transmitted to the vehicle, and the amount of unburned fuel is predicted by using the learned model from the acquired parameters in the vehicle, the server comprising a parameter value acquiring unit for acquiring an amount of unburned fuel exhausted from an engine and parameters relating to the amount of unburned fuel, a storage unit for storing a data set showing the relationship between the parameters and amount of unburned fuel which are acquired by the parameter value acquiring unit, a parameter selecting unit for selecting parameters with strong degrees of correlation with the amount of unburned fuel from among the parameters stored in the data set, and a learning unit for learning weights of the neural network from the selected parameters and amount of unburned fuel.

Advantageous Effects of Invention

According to the first to fourth aspects of the invention, it becomes possible to precisely predict the amount of unburned fuel by selecting parameters with strong degrees of correlation with the amount of unburned fuel exhausted from an internal combustion engine from parameters relating to operation of the engine to perform a machine learning of the amount of unburned fuel based on the selected parameters and amount of unburned fuel.

According to the fifth aspect of the invention, a learned model able to precisely predict the amount of unburned fuel is provided.

According to the sixth aspect of the invention, an electronic control unit able to precisely predict the amount of unburned fuel is provided.

According to the seventh aspect of the invention, a method of production of electronic control unit able to precisely predict the amount of unburned fuel is provided.

According to the eighth aspect of the invention, a machine learning system able to precisely predict the amount of unburned fuel is provided.

According to the ninth aspect of the invention, a vehicle-mounted electronic control unit able to precisely predict the amount of unburned fuel is provided.

BRIEF DESCRIPTION OF DRAWINGS

FIG. 8 is a view showing a list of a data set used in an embodiment of the present invention.

DESCRIPTION OF EMBODIMENTS

Overall Configuration of Internal Combustion Engine

Figure 1:
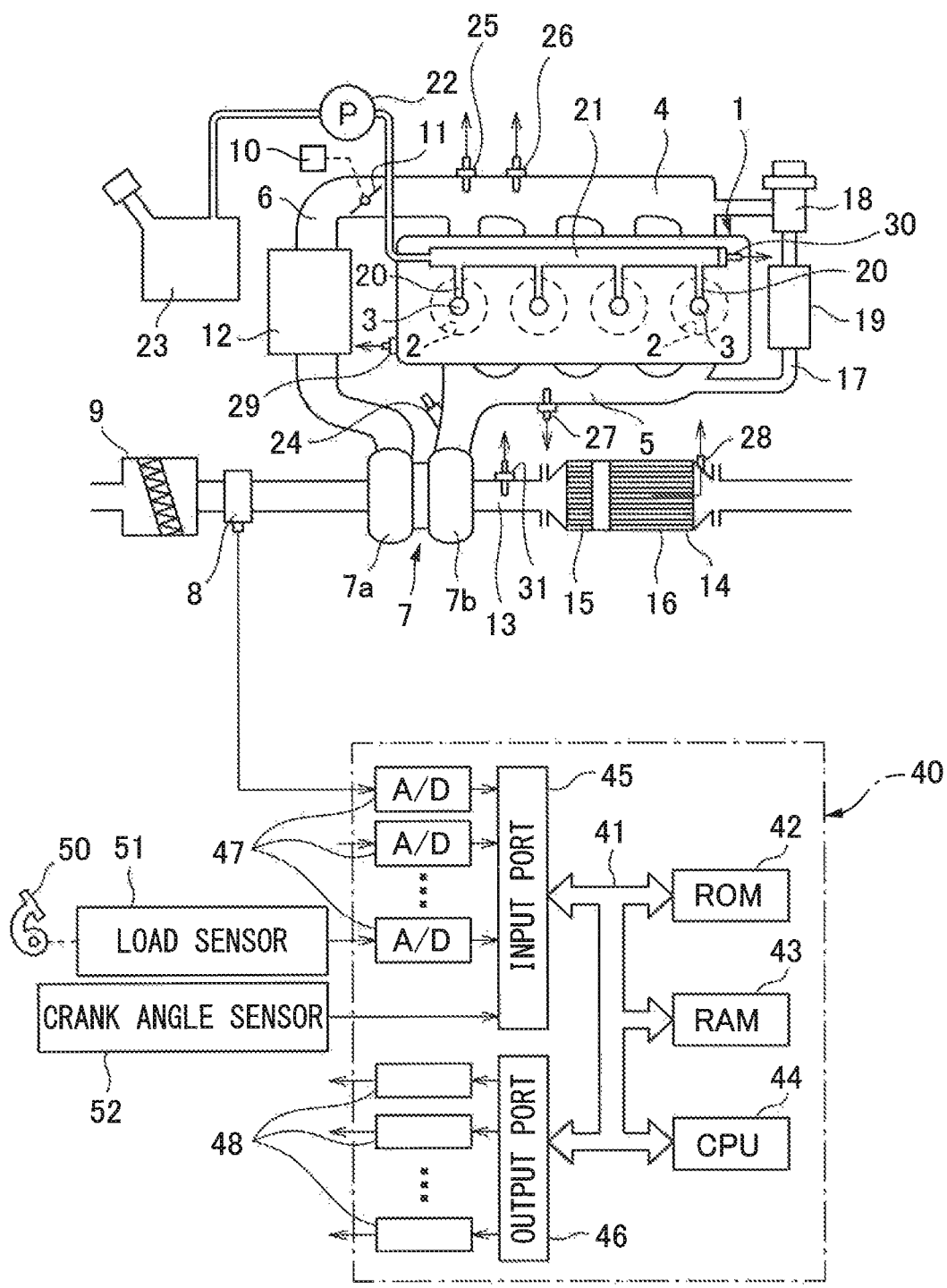
FIG. 1 is an overview of an internal combustion engine.

FIG. 1 shows the overall configuration of an internal combustion engine. Referring to FIG. 1, 1 shows an engine body, 2 combustion chambers of the cylinders, 3 fuel injectors arranged in the combustion chambers 2 of the cylinders, 4 an intake manifold, and 5 an exhaust manifold. The intake manifold 4 is connected through an intake duct 6 to the outlet of a compressor 7a of an exhaust turbocharger 7, while the inlet of the compressor 7a is connected through an intake air amount detector 8 to an air cleaner 9. Inside the intake duct 6, a throttle valve 11 driven by an actuator 10 is arranged and, around the intake duct 6, an intercooler 12 is arranged for cooling the intake air flowing through the inside of the intake duct 6.

On the other hand, the exhaust manifold 5 is connected to the inlet of the exhaust turbine 7b of the exhaust turbocharger 7, while the outlet of the exhaust turbine 7b is connected through an exhaust pipe 13 to a catalytic converter 14. In an embodiment of the present invention, an oxidation catalyst 15 and a particulate filter 16 are arranged in the catalytic converter 14 in this order from the upstream side. The exhaust manifold 5 and the intake manifold 4 are connected with each other through an exhaust gas recirculation (below, referred to as "EGR") passage 17. Inside the EGR passage 17, an EGR control valve 18 is arranged. In addition, inside the EGR passage 17, an EGR cooler 19 is arranged for cooling the EGR gas flowing through the inside of the EGR passage 17. Each fuel injector 3 is connected through a fuel supply pipe 20 to a common rail 21, and this common rail 21 is connected through a fuel pump 22 to a fuel tank 23.

As shown in FIG. 1, a fuel supply valve 24 for injecting fuel into the exhaust manifold 5 is arranged in the exhaust manifold 5. On the other hand, an intake pressure sensor 25 for detecting intake pressure in the intake manifold 4 is arranged in the intake manifold 4, and an intake temperature sensor 26 for detecting intake temperature in the intake manifold 4 is arranged in the intake manifold 4. In addition, an exhaust pressure sensor 27 for detecting exhaust pressure in the exhaust manifold 5 is arranged in the exhaust manifold 5, and a catalyst temperature sensor 28 for detecting catalyst temperature, for example, temperature of the particulate filter 16 is arranged in the catalytic converter 14. Further, a water temperature sensor 29 for detecting cooling water temperature of the engine is arranged in the engine body 1, and a fuel pressure sensor 30 for detecting fuel pressure in the common rail 21, that is, common rail pressure is arranged in the common rail 21.

Figure 2:
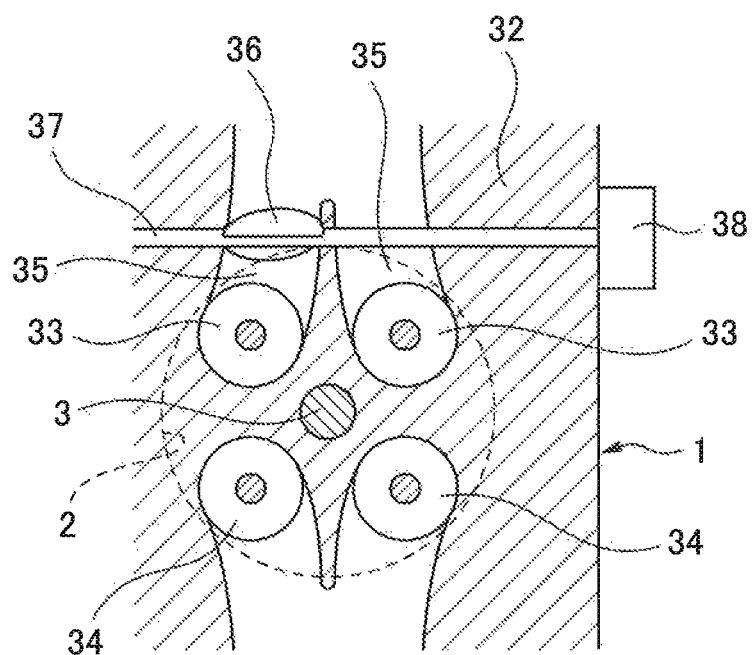
FIG. 2 is a plan cross-sectional view of a cylinder head.

On the other hand, in an example shown in FIG. 1, a HC concentration sensor 31 for acquiring an amount of unburned HC discharged from the engine is arranged in the exhaust pipe 13. When using such HC concentration sensor 31, the amount of unburned HC is calculated from an output value of the HC concentration sensor 31 and an intake air amount. Note that, instead of using the HC concentration sensor 31, a gas analyzer able to analyze the components of the exhaust gas in the exhaust pipe 13 may be used. On the other hand, in FIG. 2 showing the cross-sectional plan view of a cylinder head 32 of the engine, 33 shows a pair of intake valves, 34 a pair of exhaust valves, 35 intake ports branched into two toward a pair of intake valves 33, 36 a swirl control valve arranged in one of the intake ports 35, 37 a valve shaft of the swirl control valve 36, and 38 an actuator for controlling the opening degree of the swirl control valve 36. When the swirl control valve 36 is closed, a swirl flow swirling about the axis of the cylinder is generated in the combustion chamber 2.

Referring to FIG. 1 again, an electronic control unit 40 is comprised of a digital computer provided with a ROM (read only memory) 42, RAM (random access memory) 43, CPU (microprocessor) 44, input port 45, and output port 46, which are connected with each other by a bidirectional bus 41. At the input port 45, output signals of the intake air amount detector 8, intake pressure sensor 25, intake temperature sensor 26, exhaust pressure sensor 27, catalyst temperature sensor 28, water temperature sensor 29, and fuel pressure sensor 30 are input through corresponding AD converters 47. In addition, output signal of the HC concentration sensor 31 or output signal of the gas analyzer is input through corresponding AD converter 47 to the input port 45.

At an accelerator pedal 50, a load sensor 51 generating an output voltage proportional to the amount of depression of the accelerator pedal 50 is connected. The output voltage of the load sensor 51 is input through the corresponding AD converter 47 to the input port 45. Furthermore, the input port 45 is connected to a crank angle sensor 52 generating an output pulse each time a crankshaft rotates by for example 30°. Inside the CPU 44, the engine speed is calculated based on the output signals of the crank angle sensor 52. On the other hand, the output port 46 is connected through corresponding drive circuits 48 to the fuel injectors 4, the throttle valve drive use actuator 10, EGR control valve 18, fuel pump 22, and swirl control valve drive use actuator 38.

Figure 3:
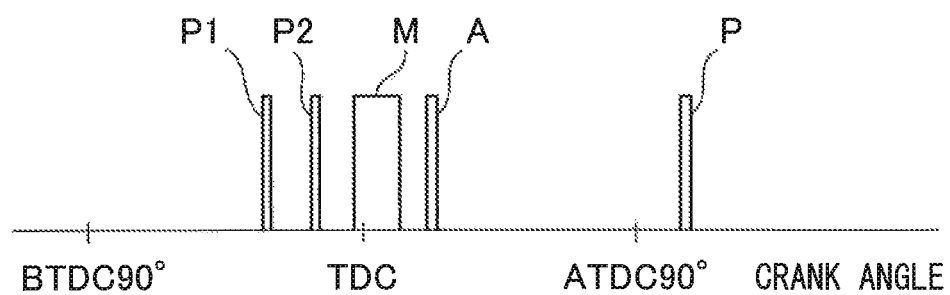
FIG. 3 is a view showing a mode of fuel injection from a fuel injector.

FIG. 3 shows a mode of fuel injection from the fuel injector 3. Note that in FIG. 3, the abscissa shows a crank angle. Now then, in FIG. 3, M shows a main injection performed near the compression top dead center, P1 shows a No. 1 pilot injection performed first before the main injection M, and P2 shows a No. 2 pilot injection performed before the main injection M and after the No. 1 pilot injection. In addition, A shows an after injection performed after the main injection M and before ATDC 70°. In this case, the fuel injected by the after injection A is burned in the combustion chamber 2. On the other hand, P shows a post injection performed after the main injection M and after ATDC 70°. In this case, the fuel injected by the post injection P is not burned in the combustion chamber 2 and is discharged from the combustion chamber 2 in the form of unburned HC. Note that the above crank angle of ATDC 70° merely shows one example.

Summary of Neural Network

Figure 4:
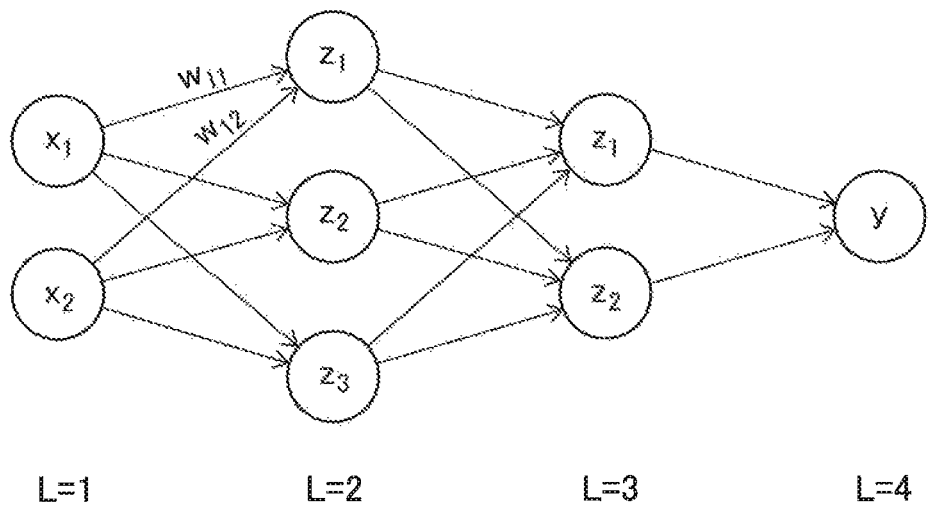
FIG. 4 is a view showing one example of a neural network.

In embodiments of the present invention, neural networks are used to estimate various values representing the performance of the internal combustion engine. FIG. 4 shows one example of a neural network. The circle marks in FIG. 4 show artificial neurons. In the neural network, these artificial neurons are usually called "node" or "unit" (in the present application, they are called "node"). In FIG. 4, L=1 shows an input layer, L=2 and L=3 show hidden layers, and L=4 shows an output layer. Further, in FIG. 4, $x_1$ and $x_2$ show output values from the nodes of the input layer (L=1), "y"

shows the output value from the node of the output layer (L=4), $z_1$, $z_2$, and $z_3$ show output values from the nodes of one hidden layer (L=2), $z_1$ and $z_2$ show output values from the nodes of another hidden layer (L=3). Note that, the number of hidden layers may be made one or any other number, while the number of nodes of the input layer and number of nodes of the hidden layers may also be made any numbers. Note that, in the embodiments according to the present invention, the number of nodes of the output layer is made one node.

At the nodes of the input layer, the inputs are output as they are. On the other hand, at the nodes of one hidden layer (L=2), the output values $x_1$ and $x_2$ of the nodes of the input layer are input, while at the nodes of one hidden layer (L=2), the respectively corresponding weights "w" and biases "b" are used to calculate the sum input value "u". For example, a sum input value $u_k$ calculated at a node shown by $z_k$ (k=1, 2, 3) of one hidden layer (L=2) in FIG. 4 becomes as shown in the following formula:

$$U_k = \sum_{m=1}^{n}(x_m \cdot w_{km}) + b_k$$

Next, this sum input value $u_k$ is converted by an activating function "f" and is output from a node shown by $z_k$ of one hidden layer (L=2) as an output value $z_k$ (=f($u_k$)). The same is true for the other nodes of one hidden layer (L=2). On the other hand, the nodes of another hidden layer (L=3) receive as input the output values $z_1$, $z_2$, and $z_3$ of the nodes of one hidden layer (L=2). At the nodes of the other hidden layer (L=3), the respectively corresponding weights "w" and biases "b" are used to calculate the sum input value u(Σz·w+b). The sum input value "u" is similarly converted by an activating function and output from the nodes of the other hidden layer (L=3) as the output values $z_1$ and $z_2$. Note that, in embodiments according to the present invention, as this activating function, a Sigmoid function σ is used.

On the other hand, at the node of the output layer (L=4), the output values $z_1$ and $z_2$ of the nodes of the other hidden layer (L=3) are input. At the node of the output layer, the respectively corresponding weights "w" and biases "b" are used to calculate the sum input value u(Σz·w+b) or just the respectively corresponding weights "w" are used to calculate the sum input value u(Σz·w). In this embodiment according to the present invention, at the node of the output layer, an identity function is used, therefore, from the node of the output layer, the sum input value "u" calculated at the node of the output layer is output as it is as the output value "y".

Expression of Function by Neural Network

Figure 5A:
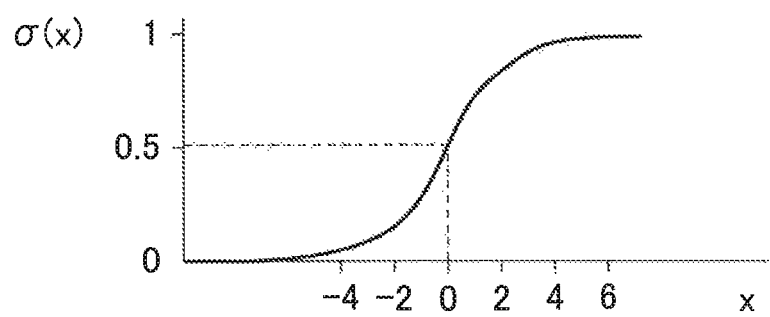
FIG. 5A and FIG. 5B are views showing changes in value of a Sigmoid function $\sigma$.
Figure 5B:
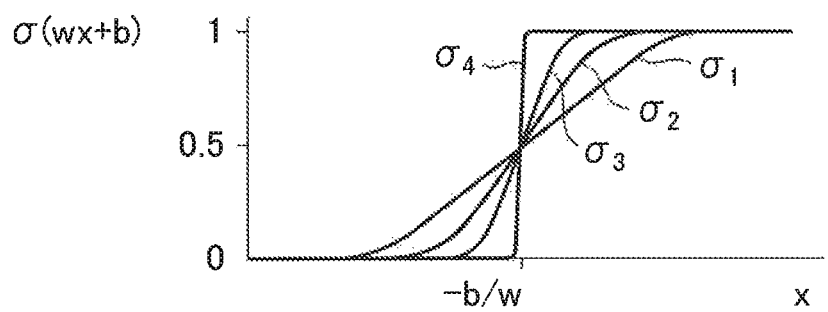

Now then, it is possible to express any function if using a neural network. Next, this will be simply explained. First, if explaining the Sigmoid function σ used as the activating function, the Sigmoid function σ is expressed as σ(x)=1/(1+exp(−x)) and takes a value between 0 and 1 corresponding to the value of "x" as shown in FIG. 5A. Here, if replacing "x" with "wx+b", the Sigmoid function σ is expressed as σ(wx+b)=1/(1+exp(−wx−b)). Here, if increasing the value of "w", as shown by the curves $\sigma_1$, $\sigma_2$, and $\sigma_3$ in FIG. 5B, the slant of the curved part of the Sigmoid function σ(wx+b) gradually becomes steeper. If making the value of "w" infinitely large, as shown by the curve $\sigma_4$ in FIG. 5B, the Sigmoid function σ(wx+b) changes in steps as shown in FIG. 5B at the "x" where x=−b/w(wx+b=0), that is, at the "x" where σ(wx+b)=0.5. If utilizing this property of the Sigmoid function σ, a neural network can be used to express any function.

Figure 6A:
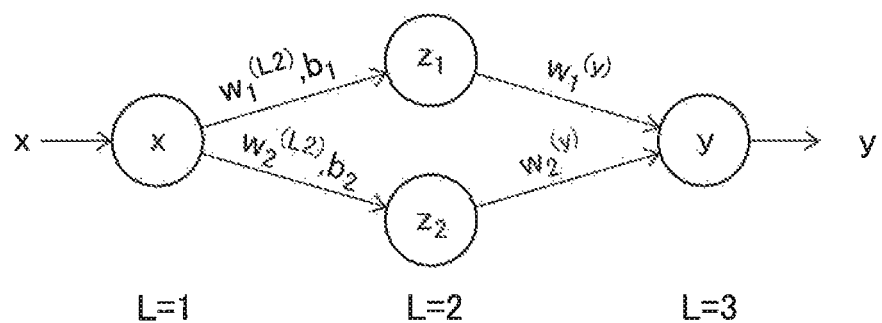
FIG. 6A and FIG. 6B respectively are views showing a neural network and output values from a node of a hidden layer.

To explain this matter, first, a neural network such as shown in FIG. 6A comprising an input layer (L=1) comprised of a single node, a hidden layer (L=2) comprised of two nodes, and an output layer (L=3) comprised of a single node will be explained. In this neural network, as shown in FIG. 6A, the node of the input layer (L=1) receives as input the input value "x", while the node shown by $z_1$ at the hidden layer (L=2) receives as input the input value u=x·$w_1^{(L2)}$+$b_1$ calculated using a weight $w_1^{(L2)}$ and a bias $b_1$. This input value "u" is converted by the Sigmoid function σ(x·$w_1^{(L2)}$+$b_1$) and output as the output value $z_1$. Similarly, the node shown by $z_2$ at the hidden layer (L=2) receives as input the input value u=x·$w_2^{(L2)}$+$b_2$ calculated using the weight $w_2^{(L2)}$ and bias $b_2$. This input value "u" is converted by the Sigmoid function σ (x·$w_2^{(L2)}$+$b_2$) and output as the output value $z_2$.

On the other hand, the node of the output layer (L=3) receives as input the output values $z_1$ and $z_2$ of the nodes of the hidden layer (L=2). At the node of the output layer, the respectively corresponding weights $w_1^{(y)}$ and $w_2^{(y)}$ are used to calculate the sum input value u(Σz·w=$z_1$·$w_1^{(y)}$+$z_2^{(y)}$·$w_2^{(y)}$). As explained above, in the embodiments according to the present invention, at the node of the output layer, an identity function is used. Therefore, from the node of the output layer, the sum input value "u" calculated at the node of the output layer is output as is as the output value "y".

Figure 6B:
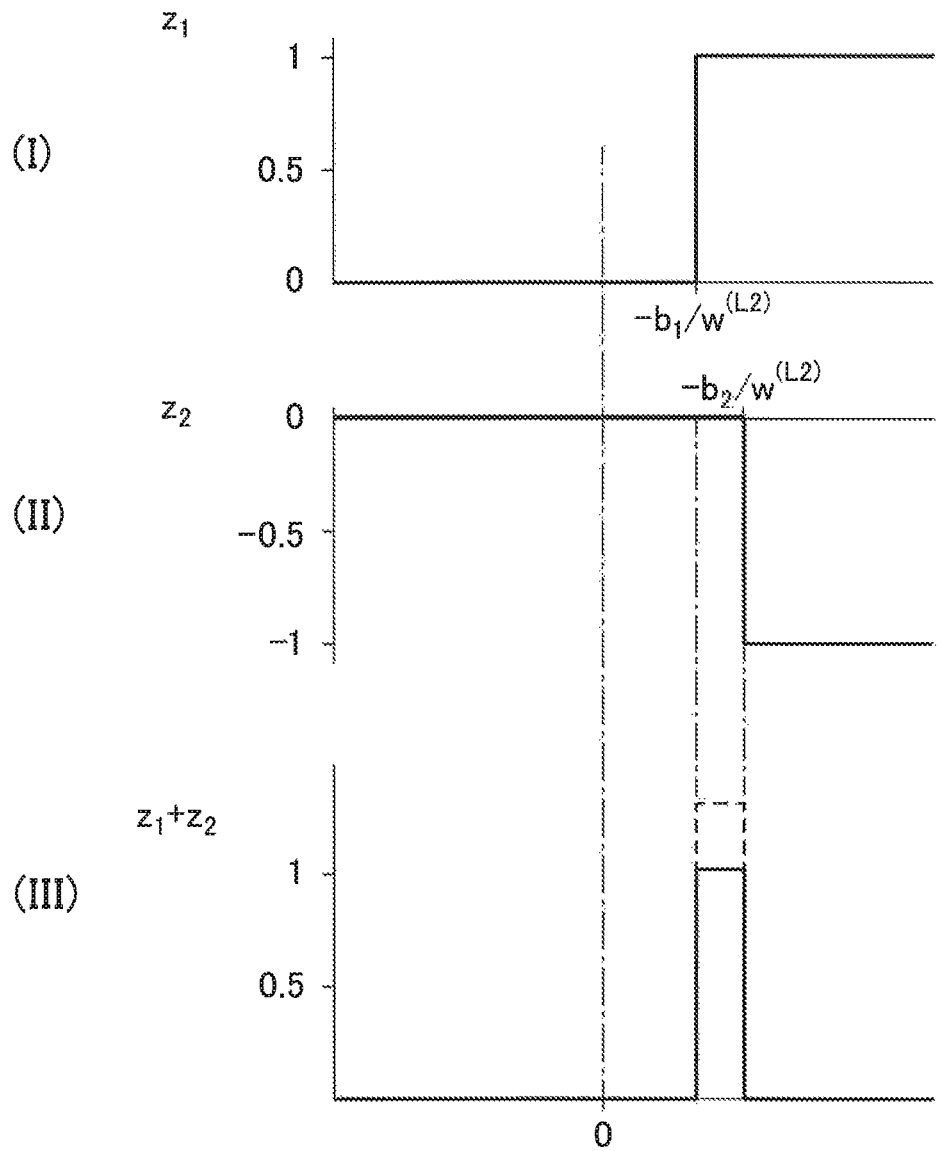

FIG. 6B shows a case where the value of the Sigmoid function σ is made to change in steps as shown in FIG. 5B by increasing the value of the weights $w_1^{(L2)}$ and $w_2^{(L2)}$. In FIG. 6B (I), the output value $z_1$ from a node of one hidden layer (L=2) when the weight $w_1^{(L2)}$ and bias $b_1$ are set so that the value of the Sigmoid function σ(x·$w_1^{(L2)}$+$b_1$) increases in steps at x=−$b_1$/$w_1^{(L2)}$ is shown. In addition, in FIG. 6B (II), the output value $z_1$ from a node of one hidden layer (L=2) when the weight $w_1^{(L2)}$ and bias $b_1$ are set so that the value of the Sigmoid function σ(x·$w_1^{(L2)}$+$b_1$) decreases in steps at x=−$b_2$/$w_2^{(L2)}$ which is slightly larger than x=−$b_1$/$w_1^{(L2)}$ is shown. Further, in FIG. 6B (III), the sum ($z_1$+$z_2$) of the output values $z_1$ and $z_2$ from the nodes of the hidden layer (L=2) is shown by the solid line. Note that, as shown in FIG. 6A, the output values $z_1$ and $z_2$ are multiplied with the respectively corresponding weights $w_1^{(y)}$ and $w_2^{(y)}$. In FIG. 6B (III), the change in the output value "y" when $w_1^{(y)}$ and $w_2^{(y)}$>1 is shown by the broken line.

Figure 7A:
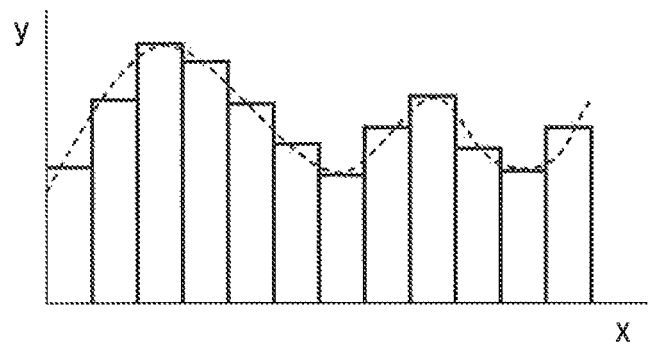
FIG. 7A is a view showing output values from a node of an output layer.
Figure 7B:
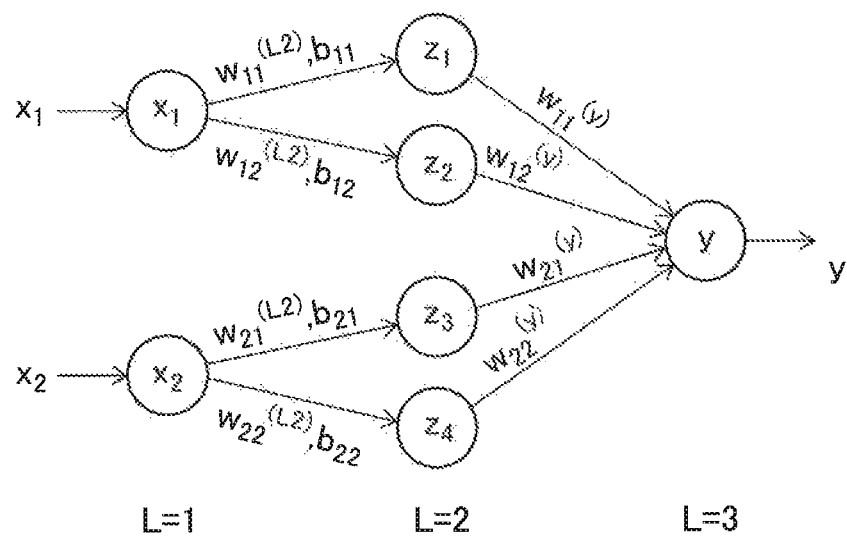
FIG. 7B is a view showing a neural network.
Figure 7C:
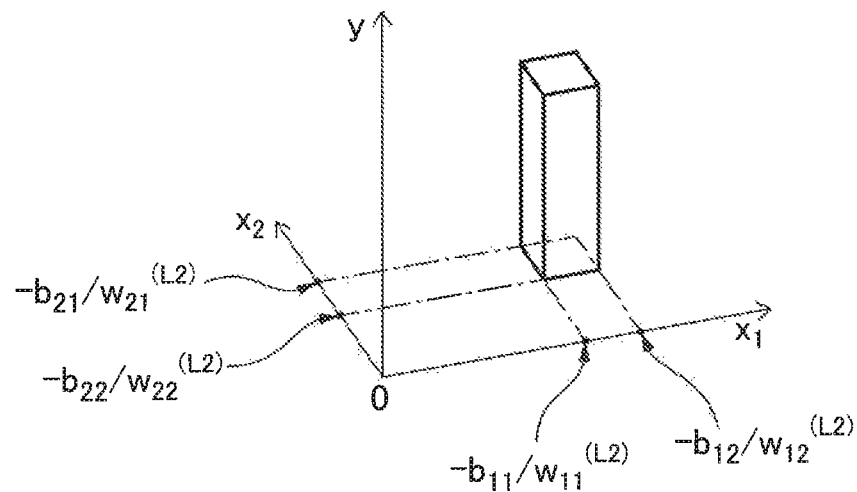
FIG. 7C is a view showing an output value from a node of an output layer.

In this way, in the neural network shown in FIG. 6A, from the pair of nodes of the hidden layer (L=2), a bar-shaped output value "y" such as shown in FIG. 6B (III) is obtained. Therefore, if increasing the number of paired nodes in the hidden layer (L=2) and suitably setting the values of the weights "w" and biases "b" at the nodes of the hidden layer (L=2), it becomes possible to express a function approximating the function y=f(x) such as shown by the curved line of the broken line in FIG. 7A. Note that, in FIG. 7A, the bars are drawn contiguous with each other, but in actuality the bars sometimes partially overlap. Further, in actuality, the value of "w" is not infinitely large, so the bars do not become precise bar shapes but become curved shapes like the top half of the curved part shown by $\sigma_3$ in FIG. 5B. Note that, while a detailed explanation will be omitted, as shown in FIG. 7B, if providing pairs of nodes at the hidden layer (L=2) respectively corresponding to the two different input values $x_1$ and $x_2$, as shown in FIG. 7C, column-shaped output values "y" corresponding to the input values $x_1$ and $x_2$ are obtained. In this case, if providing a large number of paired nodes at the hidden layer (L=2) for the input values $x_1$, $x_2$, a plurality of column-shaped output values "y" respectively corresponding to the different input values $x_1$ and $x_2$ are obtained. Therefore, it will be understood that it is possible to express a function showing the relationship between the input values $x_1$ and $x_2$ and the output values "y". Note that, in the case of three or more different input values "x" as well, similarly, it is possible to express a function showing the relationship between the input values "x" and the output values "y". When there is one input value, the function is expressed on a two-dimensional plane by the one input value+one output value. When there are two input values, the function is expressed in a three-dimensional space by the two input values+one output value. That is, when there are "n" input values, the function is expressed on an n+1 dimensional plane by the n input value+one output value. Note that it is not possible to express a space of a four-dimensional or higher plane on a sheet of paper, so such an illustration is omitted.

In the present embodiment, as the activation function, a Sigmoid function is selected, but in principle it may also be a function which monotonously increases and can be differentiated. In addition, when it is difficult to analytically find a function in case where a local minimum value (or a local minimum value) of the later explained error function (cost function) is used, the gradient descent method is used, and the reason for using a Sigmoid function is to facilitate calculation by using the later explained error back propagation method when using the gradient descent method. Therefore, if calculation by the gradient descent method is possible, a Sigmoid function need not be used. Further, the gradient descent method is used because analytic calculation is not possible, but if analytic calculation is possible, there is no need to use the gradient descent method.

Learning in Neural Network

On the other hand, in the embodiments according to the present invention, an error backpropagation algorithm is used to learn the values of the weights "w" and biases "b" in a neural network. This error backpropagation algorithm is known. Therefore, the error backpropagation algorithm will be explained simply below in its outlines. Note that, a bias "b" is one kind of weight "w", so in the following explanation, a bias "b" is deemed one type of weight "w". Now then, in the neural network such as shown in FIG. 4, if the weight at the input value $u^{(L)}$ to the nodes of each layer of L=2, L=3, or L=4 is expressed by $w^{(L)}$, the differential due to the weight $w^{(L)}$ of the error function E, that is, the gradient $\partial E/\partial w^{(L)}$, can be rewritten as shown in the following formula:

$$\partial E/\partial w^{(L)} = (\partial E/\partial u^{(L)})(\partial u^{(L)}/\partial w^{(L)}) \quad (1)$$

where, $z^{(L-1)} \cdot \partial w^{(L)} = \partial u^{(L)}$, so if $(\partial E/\partial u^{(L)}) = \delta^{(L)}$, the above formula (1) can be shown by the following formula:

$$\partial E/\partial w^{(L)} = \delta^{(L)} \cdot z^{(L-1)} \quad (2)$$

Here, if $u^{(L)}$ fluctuates, fluctuation of the error function E is caused through the change in the sum input value $u^{(L+1)}$ of the following layer, so $\delta^{(L)}$ can be expressed by the following formula.

$$\delta^{(L)} = (\partial E/\partial u^{(L)}) = \sum_{k=1}^{k}(\partial E/\partial u_k^{(L+1)})(\partial u_k^{(L+1)}/\partial u^{(L)})(k=1,2\ldots) \quad (3)$$

where, if $z^{(L)} = f(u^{(L)})$, the input value $u_k^{(L+1)}$ appearing at the right side of the above formula (3) can be expressed by the following formula:

$$\text{Input value } u_k^{(L+1)} = \Sigma_{k=1}^{k} w_k^{(L+1)} \cdot z^{(L)} = \Sigma_{k=1}^{k} w_k^{(L+1)} \cdot f(u^{(L)}) \quad (4)$$

where, the first term $(\partial E/\partial u^{(L+1)})$ at the right side of the above formula (3) is $\delta^{(L+1)}$, and the second term $(\partial u_k^{(L+1)}/\partial u^{(L)})$ at the right side of the above formula (3) can be expressed by the following formula:

$$\partial(w_k^{(L+1)} \cdot z^{(L)})/\partial u^{(L)} = w_k^{(L+1)} \cdot \partial f(u^{(L)})/\partial u^{(L)} = w_k^{(L+1)} \cdot f(u^{(L)}) \quad (5)$$

Therefore, $\delta^{(L)}$ is expressed by the following formula:

$$\delta^{(L)} = \sum_{k=1}^{k} w_k^{(L+1)} \cdot \delta^{(L+1)} \cdot f(u^{(L)})$$

That is, $$\delta^{(L-1)} = \sum_{k=1}^{k} w_k^{(L)} \cdot \delta^{(L)} \cdot f(u^{(L-1)}) \quad (6)$$

That is, if $\delta^{(L+1)}$ is found, it is possible to find $\delta^{(L)}$.

Now then, when training data $y_t$ is found for a certain input value, and the output value from the output layer corresponding to this input value is "y", if the square error is used as the error function, the square error E is found by $E=\frac{1}{2}(y-y_t)^2$. In this case, at the node of the output layer (L=4) of FIG. 2, the output value "y" becomes $f(u^{(L)})$, therefore, in this case, the value of $\delta^{(L)}$ at the node of the output layer (L=4) becomes like in the following formula:

$$\delta^{(L)} = \partial E/\partial u^{(L)} = (\partial E/\partial y)(\partial y/\partial u^{(L)}) = (y-y_t) \cdot f(u^{(L)}) \quad (7)$$

In this regard, in the embodiments of the present invention, as explained above, $f(u^{(L)})$ is an identity function and $f(u^{(L)})=1$. Therefore, $\delta^{(L)}=y-y_t$ and $\delta^{(L)}$ are found.

If $\delta^{(L)}$ is found, the $\delta^{(L-1)}$ of the previous layer is found by using the above formula (6). The $\delta$ of the previous layer is successively found in this way. Using these values of $\delta$, from the above formula (2), the differential of the error function E, that is, gradient $\partial E/\partial w^{(L)}$, is found for each weight "w". If the gradient $\partial E/\partial w^{(L)}$ is found, this gradient $\partial E/\partial w^{(L)}$ is used to update the value of the weight "w" so that the value of the error function E decreases. That is, the value of the weight "w" is learned. Note that, when as the training data, a batch or minibatch is used, as the error function E, the following mean squared error E is used:

$$\text{Mean Squared error } E = \frac{1}{n}\sum_{k=1}^{k} \frac{1}{2}(y_k - y_t)^2 \quad (8)$$

($k = 1, 2 \ldots , n$ is total number of training data)

On the other hand, if online learning designed to sequentially calculate the square error is performed, as the error function E, the above square error E is used.

EMBODIMENTS ACCORDING TO PRESENT INVENTION

Now then, in the internal combustion engine shown in FIG. 1, a particulate filter regeneration control for regenerating the particulate filter 16 by periodically maintaining the temperature of the particulate filter 16 at a target regeneration temperature higher than the temperature at the time of normal operation to thereby burn away the particulate deposited on the particulate filter 16 is performed. In this case, if the temperature of the particulate filter 16 is too high compared with the target regeneration temperature, there is the danger of the particulate filter 16 deteriorating or being melted, while if the temperature of the particulate filter 16 is too low compared with the target regeneration temperature, the deposited particulate can no longer be burned away well. Therefore, to secure a good regeneration of the particulate filter 16, it is necessary to maintain the temperature of the particulate filter 16 at the target regeneration temperature.

In this regard, in the internal combustion engine shown in FIG. 1, if fuel is injected from the fuel injectors 3 to the insides of the combustion chambers 2 by post injection P (see FIG. 3) or if fuel is injected from the fuel supply valve 24 to the inside of the exhaust manifold 5, these fuel will not burn, but will be sent as unburned fuel to the oxidation catalyst 15 and particulate filter 16. This unburned fuel is oxidized at the oxidation catalyst 15 or particulate filter 16 and, due to the heat of oxidation reaction occurring at this time, the temperature of the particulate filter 16 is made to rise. On the other hand, unburned fuel which remains after combustion in the combustion chambers 2 is exhausted from the combustion chambers 2. This unburned fuel is also oxidized at the oxidation catalyst 15 or particulate filter 16, and the temperature of the particulate filter 16 is made to rise by the heat of oxidation reaction generated at this time as well.

In this case, the temperature of the particulate filter 16 is determined by the heat of oxidation reaction generated at the oxidation catalyst 15 or particulate filter 16. Therefore, the temperature of the particulate filter 16 is determined by the amount of unburned fuel sent into the oxidation catalyst 15 and particulate filter 16. Therefore, in the internal combustion engine shown in FIG. 1, when the temperature of the particulate filter 16 should be maintained at the target regeneration temperature, while taking the amount of unburned fuel, remaining after combustion in the combustion chambers 2 and exhausted therefrom, into consideration, the post injection amount injected from the fuel injectors 3 or the fuel injection amount injected from the fuel supply valve 24 is controlled so that the temperature of the particulate filter 16 is maintained at the target regeneration temperature.

In this case, the post injection amount to be injected from the fuel injectors 3 is an amount obtained by subtracting the amount of unburned fuel which remains after combustion, that is, the amount of unburned fuel derived from other than post injection (in the example of FIG. 3, P1, P2, M, A) from the amount of unburned fuel required for maintaining the temperature of the particulate filter 16 at the target regeneration temperature. Similarly, the fuel injection amount to be injected from the fuel supply valve 24 is an amount obtained by subtracting the amount of unburned fuel, remaining after combustion in the combustion chambers 2 and exhausted therefrom, from the amount of unburned fuel required for maintaining the temperature of the particulate filter 16 at the target regeneration temperature. Therefore, to accurately maintain the temperature of the particulate filter 16 at the target regeneration temperature, it is necessary to accurately estimate the amount of unburned fuel remaining after combustion in the combustion chambers 2 and exhausted from the combustion chambers 2. Therefore, in the present invention, the neural network is used to accurately estimate the amount of unburned fuel remaining after combustion in the combustion chambers 2 and exhausted from the combustion chambers 2. Note that, below, this amount of unburned fuel, remaining after combustion in the combustion chambers 2 and exhausted from the combustion chambers 2, will be simply referred to as the "amount of unburned fuel" or "amount of unburned fuel exhausted from the combustion chambers 2". Therefore, the amount of unburned fuel or amount of unburned fuel exhausted from the combustion chambers 2 does not include fuel due to post injection.

In this regard, if using the neural network to estimate the amount of unburned fuel in this way, it is necessary to use parameters having effects on the amount of unburned fuel as input of the neural network. The parameters having effects on the amount of unburned fuel are determined based on the past experience of the inventors. FIG. 8 shows one example of parameters having effects on the amount of unburned fuel in the form of a table. In the example shown in FIG. 8, "m" (m=16) number of parameters from No. 1 to No. 16, that is, the main injection amount, main injection timing, first pilot injection amount, first pilot injection timing, second pilot injection amount, second pilot injection timing, after injection amount, after injection timing, common rail pressure, engine speed, intake pressure inside of the intake manifold 4, intake temperature inside the intake manifold 4, engine cooling water temperature, exhaust pressure, EGR rate, and swirl ratio, are used as input parameters. Further, No. 17 shows the output parameter. In the example shown in FIG. 8, this output parameter is the amount of unburned fuel exhausted from the combustion chambers 2.

Further, as shown in FIG. 8, the values of parameters from No. 1 to No. 16 are shown by "x1" to "x16", while the value of the output parameter, that is, the output value, is shown by "y". Note that, in the following explanation, the parameters are sometimes shown by "x1" to "x16". Further, FIG. 8 describes the method of acquisition of the parameter values x1 to x16. That is, as shown in FIG. 8, the main injection timing x2, first pilot injection amount x3, first pilot injection timing x4, second pilot injection amount x5, second pilot injection timing x6, after injection amount x7, and after injection timing x8 are acquired from command values generated at the electronic control unit (ECU) 40, while the engine speed x10 and EGR rate x15 are acquired from calculated values at the electronic control unit (ECU) 40.

Furthermore, as shown in FIG. 8, the common rail pressure x9 is acquired from the output value of the fuel pressure sensor 30, the intake pressure x11 inside of the intake manifold 4 is acquired from the output value of the intake pressure sensor 25, the intake temperature x12 inside the intake manifold 4 is acquired from the output value of the intake temperature sensor 26, the engine cooling water temperature x13 is acquired from the output value of the water temperature sensor 29, the exhaust pressure x14 is acquired from the output value of the exhaust pressure sensor 27, and the swirl ratio x16 is acquired from the demanded opening degree of the swirl control valve 36. Further, the amount of unburned fuel "y" exhausted from the combustion chambers 2 is acquired from the output value of the HC concentration sensor 31 or the output value of the gas analysis device. Note that, the method of acquiring the parameter values shown in FIG. 8 shows one example, and the parameter values shown in FIG. 8 can also be acquired from parameter values of other parameters.

Figure 9:
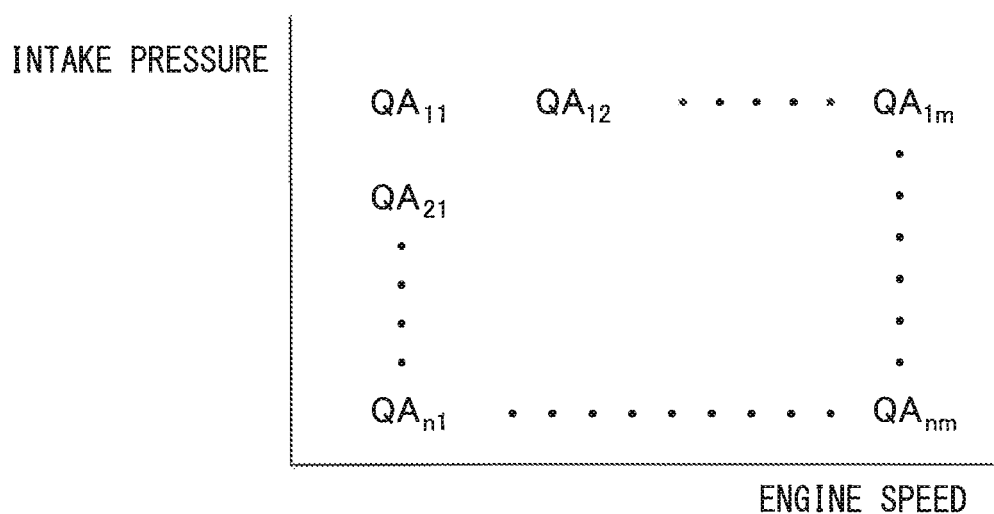
FIG. 9 is a view showing a map of an intake air amount QA sucked into a cylinder.

Here, the method of calculation of the EGR rate x15 performed in the electronic control unit (ECU) 40 will be simply explained. The intake air amount QA supplied to the combustion chambers 2 when the recirculation action of the EGR gas is stopped becomes a function of the supercharging pressure, that is, the intake pressure inside of the intake manifold 4, and the engine speed. This intake air amount QA is found in advance by experiments and, as shown in FIG. 9, is stored as a function of the intake pressure inside of the intake manifold 4 and the engine speed in the form of a map inside the ROM 42. The amount of EGR gas when the recirculation action of EGR gas is performed is an amount obtained by subtracting the intake air amount detected by the intake air amount detector 8 from the intake air amount QA stored inside the ROM 42, and the EGR rate x15 (=EGR gas amount/intake air amount QA) is calculated from this EGR gas amount and the intake air amount QA.

Now then, before an engine is shipped, it is operated under various operating states to confirm performance. The values of the various parameters acquired at this time are stored in advance. The parameters from No. 1 to No. 17 shown in FIG. 8 are part of these various parameters. These various parameters include a large number of other parameters besides the No. 1 to No. 17 parameters shown in FIG. 8, for example, the temperature of the particulate filter 16 detected by the catalyst temperature sensor 28. In an embodiment according to the present invention, the amount of unburned fuel is made the subject of control as the output parameter from among these parameters stored in advance, and "m" number of parameters from No. 1 to No. 16 shown in FIG. 8 are postulated as parameters having effects on the amount of unburned fuel.

Now then, as explained above, if using the neural network to estimate the amount of unburned fuel, it is necessary to use parameters having effects on the amount of unburned fuel as input of the neural network. Therefore, it is necessary to judge whether "m" number of parameters from No. 1 to No. 16 shown in FIG. 8 actually have effects on the amount of unburned fuel, that is, whether there are strong correlations with the amount of unburned fuel. Therefore, in the embodiment according to the present invention, correlation functions are used to judge if "m" number of parameters from No. 1 to No. 16 shown in FIG. 8 have strong correlations with the amount of unburned fuel. The judgments using these correlation functions are performed based on a data set. Therefore, first, this "data set" will be simply explained.

As explained above, an engine is operated under various operating states before shipment. The values of the various parameters acquired at this time are stored in advance. Data relating to parameters from No. 1 to No. 17 shown in FIG. 8, that is, the parameter values x1 to x16 and "y", is extracted from the stored values of the parameters. The parameter values x1 to x16 and "y" extracted for each operating state are stored for each operating state as a data set in the ROM 42 or in the RAM 43. In this case, if there are "n" number of extracted operating states, "n" number of data sets are stored. The judgments using the correlation functions are performed based on these "n" number of data sets.

Figure 10A:
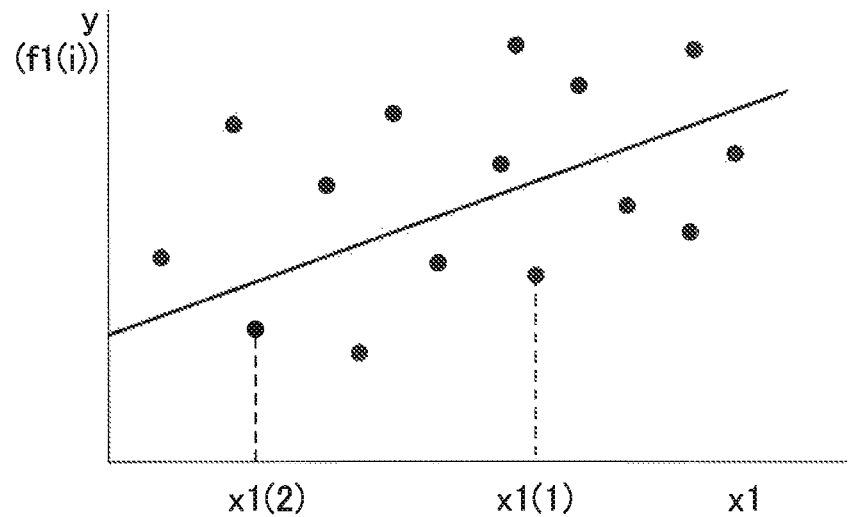
FIG. 10A and FIG. 10B are views showing a correlation function $fs(i)$.

Next, referring to FIG. 10A to FIG. 12, the method of selecting parameters having strong correlations with the amount of unburned fuel from among "m" number of parameters from No. 1 to No. 16 shown in FIG. 8 will be explained. First, referring to FIG. 10A and FIG. 10B, correlation functions will be explained. FIG. 10A shows the relationship between the parameter value x1 shown by No. 1 in FIG. 8, that is, the main injection amount x1 (abscissa), and the output value "y" shown by No. 17 in FIG. 8, that is, the amount of unburned fuel "y" exhausted from the combustion chambers 2 (ordinate). As explained above, in the embodiment according to the present invention, "n" number of data sets are stored for the operating states relating to the parameter values x1 to x16 and "y", and if expressing a main injection amount in an i-th data set as "x1($i$)", the points in FIG. 10A show the relationship between the main injection amount x1($i$) ($i$=1, 2 ... n) and the amount of unburned fuel "y" in the data set for each operating state. In the abscissa of FIG. 10A, x1(1) showing the main injection amount in the first data set and x1(2) showing the main injection amount in the second data set are described in a representative manner.

Now then, as explained above, the points in FIG. 10A show the relationship between the main injection amount x1($i$) and the amount of unburned fuel "y" in the data set for each operating state. Therefore, even if the main injection amount x1($i$) in a certain data set and the main injection amount x1($i$) in a data set different from this adjoin each other on the abscissa of FIG. 10A, that is, even if the two main injection amounts x1($i$) are substantially the same, the operating states completely differ if the data sets to which these two main injection amounts x1($i$) belong differ, so the amounts of unburned fuel "y" for these two main injection amounts x1($i$) greatly differ. Therefore, as shown in FIG. 10A, the amount of unburned fuel "y" fluctuates up and down over a wide range.

On the other hand, if viewing the fluctuation of points in FIG. 10A macroscopically, it will be learned that the larger the main injection amount x1($i$), the higher the points are positioned overall. That is, it is learned that if the main injection amount x1($i$) becomes larger, the amount of unburned fuel "y" gradually increases even if the operating state changes in various ways. This means that there is correlation between the main injection amount x1($i$) and the amount of unburned fuel "y". That is, the overall trend in changes of the points expresses the correlation. Therefore, in the embodiment according to the present invention, to express the overall trend in changes of the points by a linear function, this linear function is found using the least squares method. In this case, the linear function with respect to the main injection amount x1($i$) is expressed by the following formula if y=f1($i$):

$$f1(i) = a1 \cdot x1(i) + b1 \quad (9)$$

where, a1 expresses the slant and b1 expresses the intercept. On the other hand, if "y" when x1($i$) is y(i), the average value of x1($i$) is x1($i$)e, and the average value of y(i) is y(i)e, from the formula of the least squares method, the slant a1 and intercept b1 in the above formula (9) are expressed by the following formulas:

$$a1 = \frac{\sum_{i=1}^{n}(x1(i) - x1(i)e)(y(i) - y(i)e)}{\sum_{i=1}^{n}(x1(i) - x1(i)e)} \quad (10)$$

$$b1 = y(i)e - a1 \cdot x1(i)e \quad (11)$$

Therefore, if using the values of the x1($i$) and y(i) of the points shown in FIG. 10A to find the slant a1 and intercept b1 from the above formula (10) and above formula (11), a linear function f1($i$) for the main injection amount x1($i$) shown by the above formula (9) is found. The line shown by the solid line in FIG. 10A shows this linear function f1($i$).

Figure 10B:
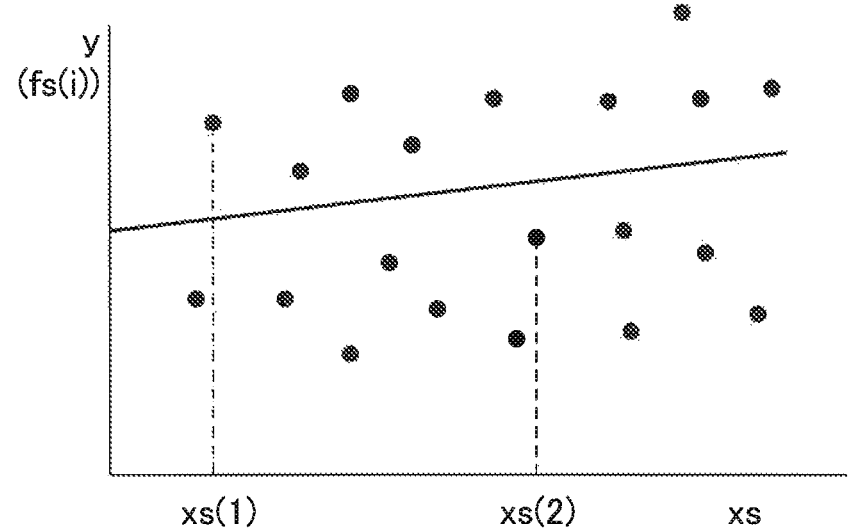

FIG. 10B shows the relationship between a value of an s-th parameter among "m" number of parameters from No. 1 to No. 16 shown in FIG. 8, that is, the No. "s" parameter value xs (abscissa), and the output value "y" shown by No. 17 in FIG. 8, that is, the amount of unburned fuel "y" exhausted from the combustion chambers 2 (ordinate). In FIG. 10B, in the same way as FIG. 10A, if expressing the parameter values in an i-th data set by "xs(i)", the points in FIG. 10B, in the same way as FIG. 10A, show the relationship between the parameter values xs(i) (i=1, 2 . . . n) in the data set and the amount of unburned fuel "y" for each operating state. In the abscissa of FIG. 10B, as representative examples, the parameter values xs(1) in the first data set and the parameter values xs(2) in the second data set are described.

If expressing the linear function with respect to the No. "s" parameter value xs(i) by y=fs(i), this linear function y=fs(i) is expressed by the following formula:

$$fs(i)=as \cdot xs(i)+bs \quad (12)$$

where "as" expresses the slant and "bs" expresses the intercept.

On the other hand, if "y" in the case of xs(i) is y(i), the average value of xs(i) is xs(i)e, and the average value of y(i) is y(i)e, from the formula of the least squares method, the slant "as" and intercept bs in the above formula (12) are expressed by the following formulas:

$$as = \frac{\sum_{i=1}^{n}(xs(i)-xs(i)e)(y(i)-y(i)e)}{\sum_{i=1}^{n}(xs(i)-xs(i)e)} \quad (13)$$

$$bs = y(i)e - as \cdot xs(i)e \quad (14)$$

Therefore, in this case as well, if using the values of xs(i) and y(i) of the points shown in FIG. 10B to find the slant "as" and the intercept bs from the above formula (13) and the above formula (14), the linear function fs(i) for the No. "s" parameter value xs shown by the above formula (12) is found. The line shown by the solid line in FIG. 10B shows this linear function fs(i).

In this regard, if comparing the linear function f1(i) shown in FIG. 10A and the linear function fs(i) shown in FIG. 10B, the linear function fs(i) shown in FIG. 10B has a smaller slant of the line compared with the linear function f1(i) shown in FIG. 10A. A small slant of the line shows that the amount of unburned fuel "y" does not change much at all even if the parameter value xs changes. That is, a small slant of the line means that there is no strong correlation between the parameter value xs(i) and the amount of unburned fuel "y". Therefore, the linear functions f1(i) and fs(i) shown by the solid lines in FIG. 10A and FIG. 10B respectively express the strength of the correlation between the parameter value x1(i) and the amount of unburned fuel "y" and the strength of the correlation between the parameter value xs(i) and the amount of unburned fuel "y". Therefore, these linear functions f1(i) and fs(i), that is, the linear function fs(i) for the parameter value xs(i) (s=1, 2 . . . 16), are called "correlation functions".

Now then, as will be understood from the above explanation, the degree of correlation between the parameter value xs(i) and the amount of unburned fuel "y" becomes stronger the larger the slant "as" of the correlation function fs(i). Therefore, it is possible to estimate the degree of correlation between the parameter value xs(i) and the amount of unburned fuel "y" from the slant "as" of the correlation function fs(i). Therefore, in the embodiment according to the present invention, the correlation functions fs(i) showing the correlations between the parameters and the amount of unburned fuel are found for the parameters xs (s=1, 2 . . . 16) relating to operation of the internal combustion engine, and the parameters with strong degrees of correlation are selected based on the correlation functions fs(i). Note that, in this case, the correlation function fs(i) is comprised of a linear function showing the relationship between the parameter value and the amount of unburned fuel calculated using the least squares method.

Now then, as explained above, it is possible to estimate the degree of correlation of the parameter value xs(i) and the amount of unburned fuel "y" from the slant "as" of the correlation function fs(i). In this regard, however, the slant "as" of the correlation function fs(i) changes according to the method of setting the gradations of the parameter values xs on the abscissa of FIG. 10B. If increasing the intervals of the gradations, the slant "as" of the correlation function fs(i) becomes smaller. Therefore, it is difficult to accurately estimate the degree of correlation of the parameter value xs(i) and the amount of unburned fuel "y" from the slant "as" of the correlation function fs(i). Therefore, in the embodiment according to the present invention, a variance V(fs) (s=1, 2 . . . 16) of the amount of unburned fuel "y" found from the average value of the amounts of unburned fuel "y" and the linear function fs(i), that is, correlation function fs(i), is used. Next, this variance V(fs) will be simply explained while referring to FIG. 11A and FIG. 11B.

Figure 11A:
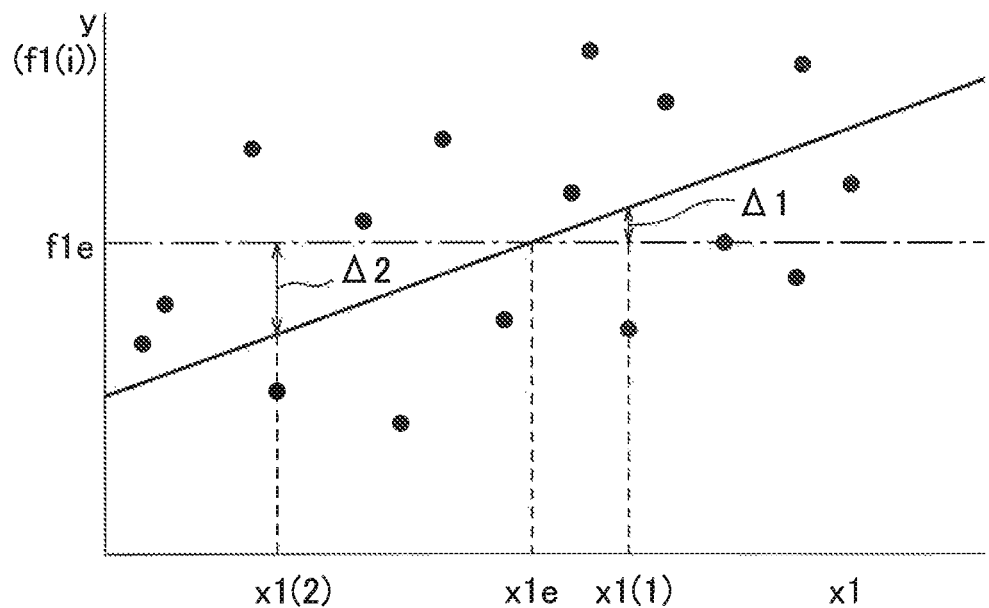
FIG. 11A and FIG. 11B are views for explaining variance.
Figure 11B:
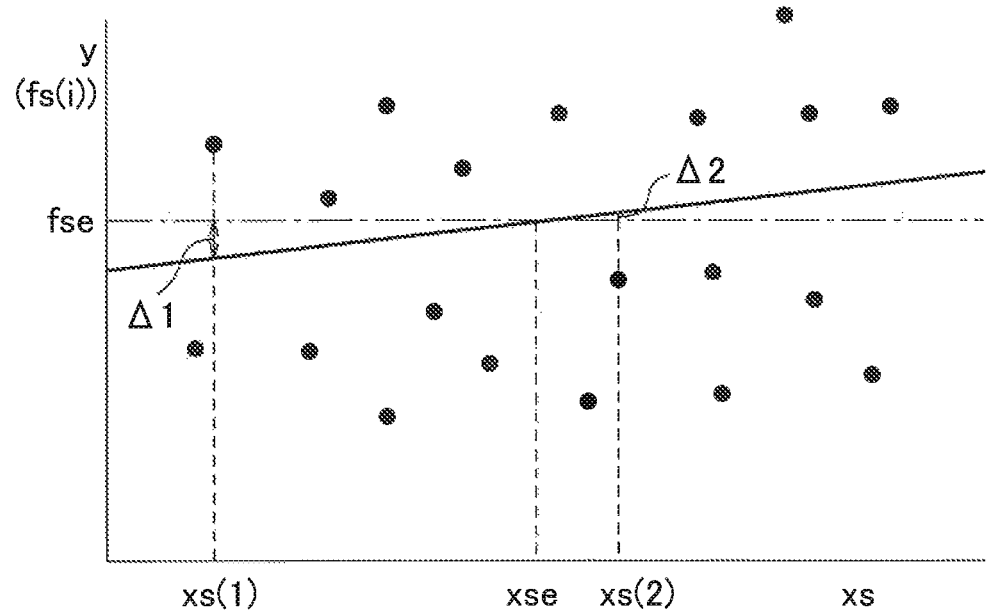

FIG. 11A shows the points shown in FIG. 10A and the correlation function f1(i) shown by the solid line in FIG. 10A plus the average value x1e of the parameter values x1(i) and average value f1e of the amounts of unburned fuel "y", while FIG. 11B shows the points shown in FIG. 10B and the correlation function fs(i) shown by the solid line in FIG. 10B plus the average value xse of the parameter values xs(i) and average value fse of the amounts of unburned fuel "y". The variance V(f1) in the case shown in FIG. 10A, as shown in FIG. 11A, is expressed by the average value of the square sums of the differences Δi between the values of the correlation functions f1(i) at the parameter values x1(i) and the average value f1e of the amounts of unburned fuel "y". Similarly, the variance V(fs) in the case shown in FIG. 10B, as shown in FIG. 11B, is expressed by the average value of the square sums of the differences Δi between the values of the correlation functions fs(i) at the parameter values xs(i) and the average value fse of the amounts of unburned fuel "y".

That is, these variance V(f1) and variance V(fs), that is, the variance V(fs) with respect to the parameter values xs(i) (s=1, 2 . . . 16), are found by the following formula:

$$V(fs) = \frac{1}{n} \cdot \sum_{i=1}^{i=n}(fs(i)-fse)^2 \quad (15)$$

If entering the above formula (12) in the above formula (15), the variance V(fs), as shown by the following formula, is expressed by the parameter values xs(i) and the average value xse of the parameter values xs(i):

$$V(fs) = \frac{1}{n} \cdot \sum_{i=1}^{n=n}(as \cdot xs(i) - as \cdot xse)^2 \quad (16)$$

In FIG. 11A and FIG. 11B, the larger the difference Δi, the larger the variance V(fs). Therefore, the degree of correlation between the parameter value xs(i) and the amount of unburned fuel "y" becomes stronger the larger the variance V(fs). Therefore, it is possible to estimate the degree of correlation between the parameter value xs(i) and the amount of unburned fuel "y" from the variance V(fs). In this case, the variance V(fs) becomes the same value regardless of how the gradations of the parameter values xs are set on the abscissas of FIG. 10B and FIG. 11B. Therefore, it becomes possible to accurately estimate the degree of correlation between the parameter value xs(i) and the amount of unburned fuel "y" from the variance V(fs). Therefore, in the embodiment according to the present invention, a correlation function is comprised of a linear function showing the relationship between the parameter value xs(i) and the amount of unburned fuel "y" calculated using the least squares method, and the variance V(fs) of the amount of unburned fuel is calculated from the average value of the amounts of unburned fuel "y" and the linear function. Parameters with a strong degree of correlation are selected based on this variance V(fs).

In this way, the degree of correlation between the parameter value xs(i) and the amount of unburned fuel "y" becomes stronger the larger the variance V(fs). Therefore, the larger the variance V(fs), the greater the effect of the parameter value xs on the amount of unburned fuel "y". In the embodiment according to the present invention, the magnitude of the effect of the parameter value xs on the amount of unburned fuel "y" is expressed by the contribution ratio shown by the following formula:

$$\text{Contribution ratio of parameter } xs = \text{Variance } V(fs) \bigg/ \sum V(fm)(= V(f1) + V(f2) + \ldots + V(f16)) \quad (17)$$

As shown in the above formula (17), the contribution ratio of the parameter xs is a value obtained by dividing the variance V(fs) of the parameter xs by the sum $\Sigma V(fm)$ of the variance V(fs) of the "m" number of parameters xs (s=1, 2 . . . 16). In this case, if the contribution ratio of the parameter xs becomes larger, the effect of the parameter value xs on the amount of unburned fuel "y" becomes larger, therefore the parameters with strong degree of correlation are selected based on the contribution ratios of the parameters xs.

That is, in the embodiment according to the present invention, the contribution ratios of the parameters xs showing the strengths of the degrees of correlation with respect to the amount of unburned fuel are calculated based on the variance V(fs), and the parameters with strong degrees of correlation are selected based on the contribution ratios of the parameters. Note that, the sum of two or more contribution ratios of the parameters xs will be called "the cumulative contribution ratio". For example, the sum of the contribution ratio of the parameter x1 and the contribution ratio of the parameter x2 is expressed by the following formula:

$$\text{Cumulative contribution ratio} = (V(f1) + V(f2))/(V(f1) + V(f2) + V(f3) + \ldots + V(f16)) \quad (18)$$

Note that, as will be understood from the above formula (18), the sum of the contribution ratios of all of the parameters xs becomes 1. Next, referring to the specific example shown in FIG. 12, the contribution ratios and cumulative contribution ratio of the parameters xs will be explained.

Figure 12:
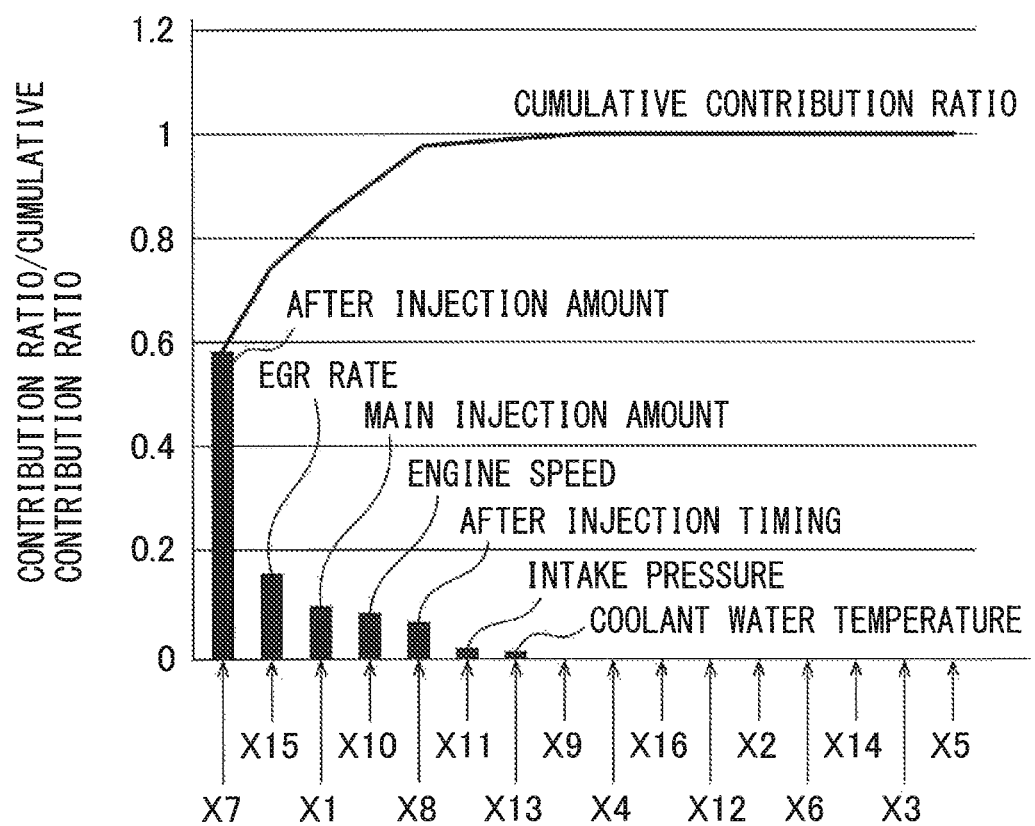
FIG. 12 is a view showing contribution ratios and a cumulative contribution ratio of parameters.

In the specific example shown in FIG. 12, the contribution ratios of the parameters xs are calculated by the above formula (17) based on the parameters x1 to x16 from No. 1 to No. 16 shown in FIG. 8 and the "n" number of data sets for each operating state relating to the amount of unburned fuel "y". In FIG. 12, all of the parameters xs are shown arranged in order from the parameter xs with the largest calculated contribution ratio. In the specific example shown in FIG. 12, the contribution ratio of the after injection amount x7 is the highest, the contribution ratio of the EGR rate x15 is the next highest, the contribution ratio of the main injection amount x1 is the next highest, the contribution ratio of the engine speed x10 is the next highest, the contribution ratio of the after injection timing x8 is the next highest, the contribution ratio of the intake pressure x11 inside of the intake manifold 4 is the next highest, and the contribution ratio of the engine cooling water temperature x13 is the next highest.

The contribution ratios of the other parameters xs, that is, the contribution ratio of the common rail pressure x9, the contribution ratio of the first pilot injection timing x4, the contribution ratio of the swirl ratio x16, the contribution ratio of the intake temperature x12 in the intake manifold 4, the contribution ratio of the main injection timing x2, the contribution ratio of the second pilot injection timing x6, the contribution ratio of the exhaust pressure x14, the contribution ratio of the first pilot injection amount x3, and the contribution ratio of the second pilot injection amount x5 are almost zero. Note that, FIG. 12 shows the cumulative contribution ratio when adding the contribution ratios in the order from the largest ones down.

Figure 13A:
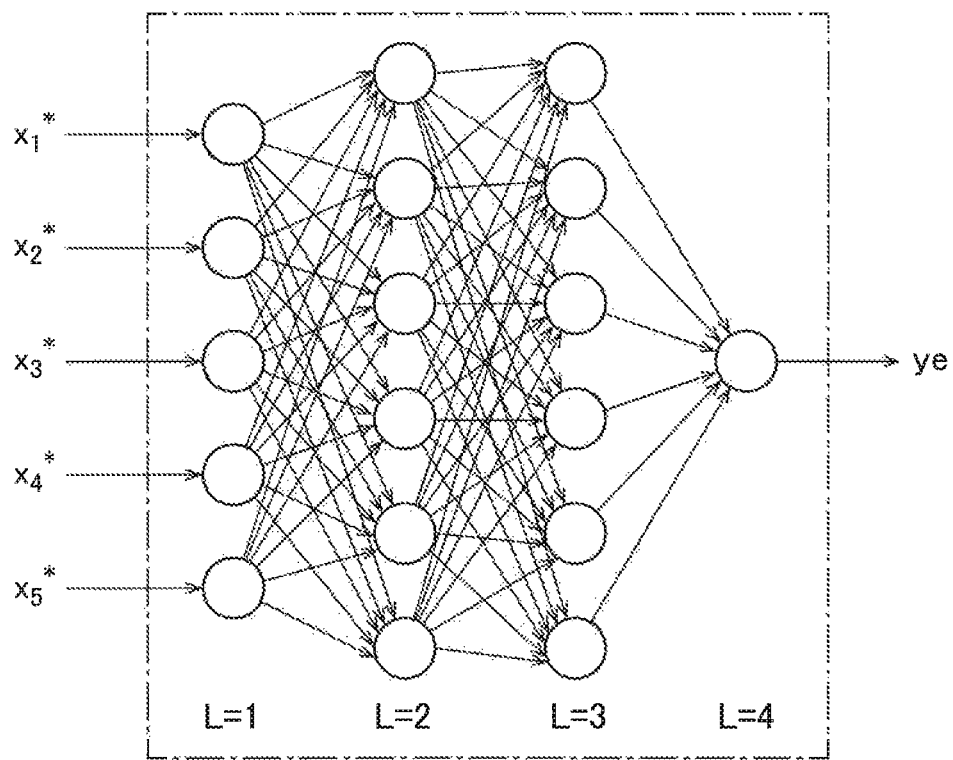
FIG. 13A and FIG. 13B are views showing neural networks.
Figure 13B:
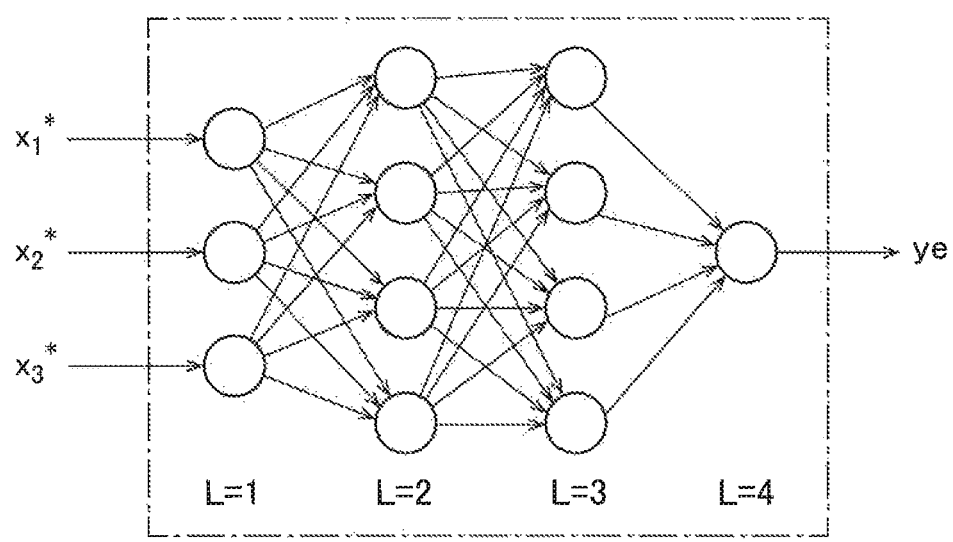

Next, in the embodiment according to the present invention, the learning control performed using the neural network based on the selected parameters xs with strong degrees of correlation will be explained while referring to FIG. 13A and FIG. 13B. FIG. 13A and FIG. 13B show neural networks. In FIG. 13A and FIG. 13B, L=1 shows the input layer, L=2 and L=3 show hidden layers, and L=4 shows the output layer. Note that, in FIG. 13A, the input layer (L=1) is comprised of five nodes, while the hidden layer (L=2) and hidden layer (L=3) are respectively comprised of six nodes, but the number of hidden layers may be one layer or any other number of layers and the number of nodes of the input layer and the number of nodes of the hidden layers may be any numbers. On the other hand, in FIG. 13B, the input layer (L=1) is comprised of three nodes while the hidden layer (L=2) and hidden layer (L=3) are respectively comprised of four nodes, but the number of hidden layers may be one layer or any other number of layers and the number of nodes of the input layer and the number of nodes of the hidden layers may be any numbers. Note that, in the embodiment according to the present invention, in each of the cases shown in FIG. 13A and FIG. 13B as well, the number of nodes of the output layer is made one node.

FIG. 13A shows the case where the five parameters $X_1^*$, $X_2^*$, $X_3^*$, $X_4^*$, and $X_5^*$ are selected as parameters xs with strong degrees of correlation. In this case, the selected five parameters $X_1^*$, $X_2^*$, $X_3^*$, $X_4^*$, and $X_5^*$ are used for learning the weights of the neural network so that the output value from the output layer (L=4) approaches the actually measured amount of unburned fuel "y". If the weights of the neural network finishes being learned, the neural network finished being learned in weights can be used to estimate the amount of unburned fuel "y". That is, if the parameters $X_1^*$, $X_2^*$, $X_3^*$, $X_4^*$, and $X_5^*$ are input to the input layer (L=1) of the neural network finished being learned in weights, the estimated value ye of the amount of unburned fuel is output from the output layer (L=4) of the neural network.

On the other hand, FIG. 13B shows the case where the three parameters $X_1^*$, $X_2^*$, and $X_3^*$ are selected as parameters xs with strong degrees of correlation. In this case, the selected three parameters $X_1^*$, $X_2^*$, and $X_3^*$ are used for learning the weights of the neural network so that the output value from the output layer (L=4) approaches the actually measured amount of unburned fuel "y". In this case as well, if the weights of the neural network finishes being learned, the neural network finished being learned in weights can be used to estimate the amount of unburned fuel "y". That is, if the parameters $X_1^*$, $X_2^*$, and $X_3^*$ are input to the input layer (L=1) of the neural network finished being learned in weights, the estimated value ye of the amount of unburned fuel is output from the output layer (L=4) of the neural network.

Figure 14:
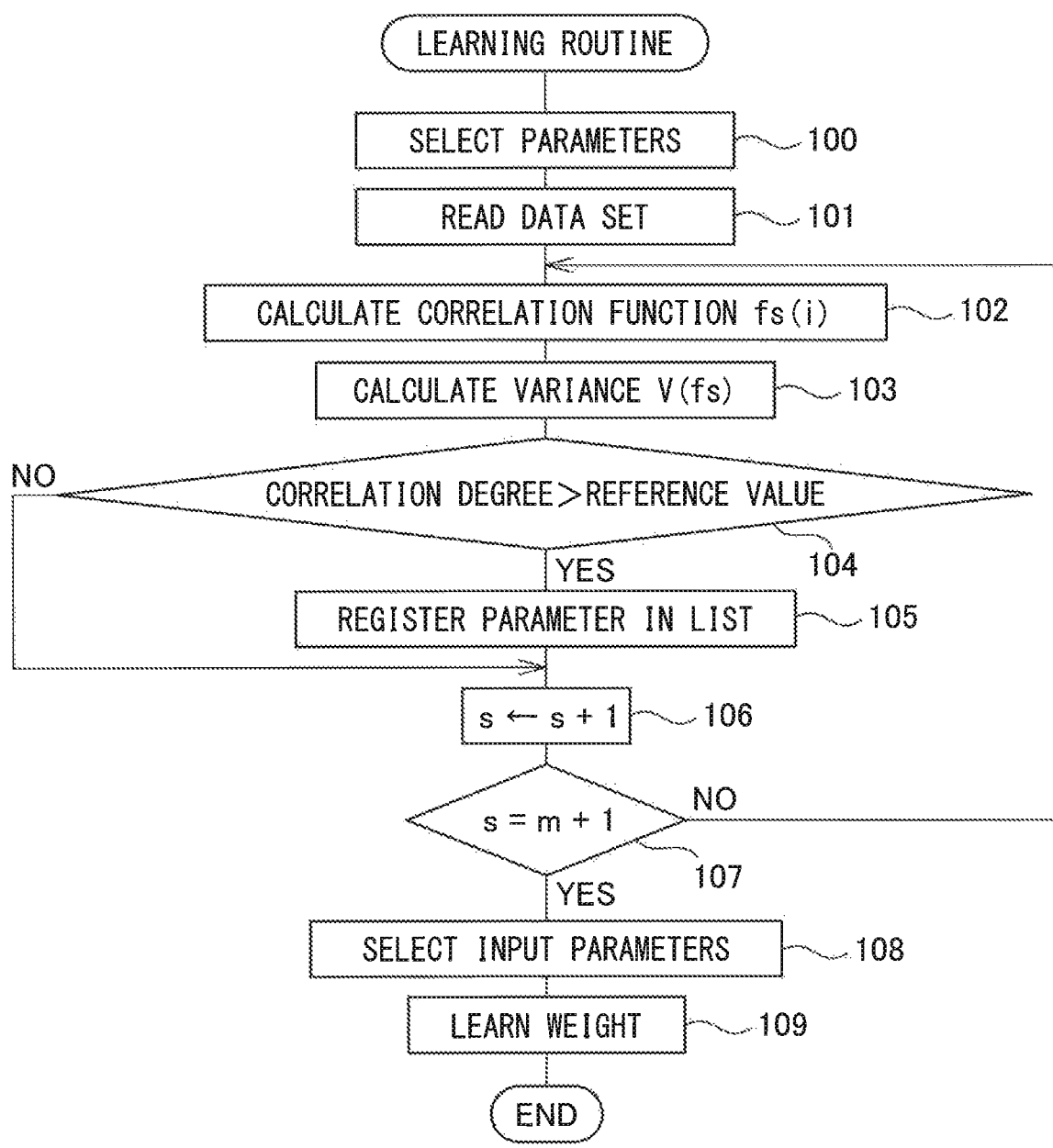
FIG. 14 is a flow chart showing a learning routine.

Next, employing as an example the case of using the data set shown in FIG. 8 for learning, one example of the learning routine shown in FIG. 14 will be explained. Referring to FIG. 14, first, at step 100, the parameters believed to have effects on amount of unburned fuel are selected. That is, as explained above, an engine is operated under various operating states before shipment to confirm its performance. The values of various parameters acquired at this time are stored in advance. At step 100, the amount of unburned fuel is selected as the output parameter from among these parameters stored in advance, while "m" number of parameters from No. 1 to No. 16 shown in FIG. 8 are selected as parameters believed to have effects on the amount of unburned fuel.

Next, at step 101, a data set showing the relationship of the selected parameters, that is, the data set shown in FIG. 8, is read in. Next, at step 102, the correlation function fs(i) regarding the parameter xs is calculated from the above formulas (12), (13), and (14). Next, at step 103, the variance V(fs) for the parameter xs is calculated from the above formula (16). Next, at step 104, based on the correlation function fs(i) or variance V(fs), it is judged whether the degree of correlation between the parameter xs and the amount of unburned fuel "y" is larger than a predetermined reference value. Note that, the initial value of "s" is made "1", so when the routine first proceeds to step 102, the correlation function f1(i) for the parameter x1 is calculated, at step 103, the variance V(f1) for the parameter x1 is calculated, and at step 104, based on the correlation function f1(i) or variance V(f1), it is judged if the degree of correlation between the parameter x1 and the amount of unburned fuel "y" is larger than the predetermined reference value.

In this case, at step 104, for example, if the slant "as" of the correlation function fs(i) for the parameter xs is a predetermined value or more, it is judged that the degree of correlation is larger than the predetermined reference value or if the variance V(f1) for the parameter xs is a predetermined value or more, it is judged that the degree of correlation is larger than the predetermined reference value. When at step 104 it is judged that the degree of correlation is larger than the predetermined reference value, the routine proceeds to step 105 where the parameter xs is registered in a list stored in the RAM 43 of the electronic control unit 40 as a parameter with a strong degree of correlation. Next, the routine proceeds to step 106.

As opposed to this, when at step 104 it is judged that the degree of correlation is not larger than the predetermined reference value, the routine jumps to step 106. At step 106, "s" is incremented by exactly 1. Next, at step 107, whether "s" becomes "m+1", that is, whether the degree of correlation and predetermined reference value have been compared for all of the "m" number of parameters xs, is judged. When "s" does not become "m+1", the routine returns to step 102. As opposed to this, when "s" becomes "m+1", that is, when it is judged that the degree of correlation and predetermined reference value have been compared for all of the "m" number of parameters xs, the routine proceeds to step 108.

At step 108, input parameters of the neural network are selected. In the example shown in FIG. 14, the parameters registered in the list at step 105, that is, the parameters with degrees of correlation larger than the predetermined reference value, are selected as input parameters of the neural network. Next, at step 109, the weights of the neural network are learned. At this time, if the parameters selected as the input parameters of the neural network are $X_1^*$, $X_2^*$, $X_3^*$, $X_4^*$, and $X_5^*$, as shown in FIG. 13A, these five parameters $X_1^*$, $X_2^*$, $X_3^*$, $X_4^*$, and $X_5^*$ are input to the input layer (L=1) of the neural network, while if the parameters selected as the input parameters of the neural network are $X_1^*$, $X_2^*$, and $X_3^*$, as shown in FIG. 13B, these three parameters $X_1^*$, $X_2^*$, and $X_3^*$ are input to the input layer (L=1) of the neural network.

In this way, in the embodiment according to the present invention, the parameters xs with strong degrees of correlation with the amount of unburned fuel exhausted from the internal combustion engine are selected from among the parameters relating to the operation of the engine, and a machine learning for estimating the amount of unburned fuel is performed based on the selected parameters. That is, a machine learning using training data is performed based on the selected parameters. Explaining this in more detail, in the embodiment according to the present invention, the parameters xs with strong degrees of correlation with the amount of unburned fuel exhausted from the internal combustion engine are selected from among the parameters relating to the operation of the engine, and a machine learning for estimating the amount of unburned fuel is performed based on the selected parameters xs by using the neural network. In this case, in the embodiment according to the present invention, a correlation function showing the correlation between the parameter and the amount of unburned fuel is found for each parameter related to operation of the internal combustion engine, and the parameters with strong degrees of correlation are selected based on this correlation function. In this case, in the embodiment according to the present invention, the correlation function is comprised of a linear function showing the relationship between a parameter value and amount of unburned fuel calculated using the least squares method, a variance of the amount of unburned fuel is calculated from the average value of the amounts of unburned fuel and this linear function, and the parameters with strong degrees of correlation are selected based on these linear functions or variance.

In this regard, in the embodiment according to the present invention, as shown in FIG. 1, the internal combustion engine is provided with the electronic control unit 40. The electronic control unit 40 comprises a parameter value acquiring unit for acquiring the values of input parameters related to operation of the engine, a processing unit for performing processing using a neural network comprised of an input layer, hidden layers, and output layer, and a storage unit. In this case, in the example shown in FIG. 1, the input port 45 forms the above-mentioned parameter value acquiring unit, the CPU 44 forms the above-mentioned processing unit, and the ROM 42 and RAM 43 form the above-mentioned storage unit. Note that, at the CPU 44, that is, the above-mentioned processing unit, the values of the operating parameters of the engine are input to the input layer, while the output value, which changes according to the values of the operating parameters of the engine, is output from the output layer.

In this case, in the embodiment according to the present invention, the amount of unburned fuel exhausted from the engine and the parameters relating to the amount of unburned fuel are acquired from the parameter value acquiring unit, a data set showing the relationship between the parameters and amount of unburned fuel, which are acquired by the parameter value acquiring unit, is stored in the storage unit, the parameters with strong degrees of correlation with the amount of unburned fuel are selected from among the parameters stored in the data set, the weights of the neural network are learned from the selected parameters and amount of unburned fuel by the processing unit, and the neural network with the learned weights is used to output an estimated value of the amount of unburned fuel corresponding to the parameters.

Figure 15A:
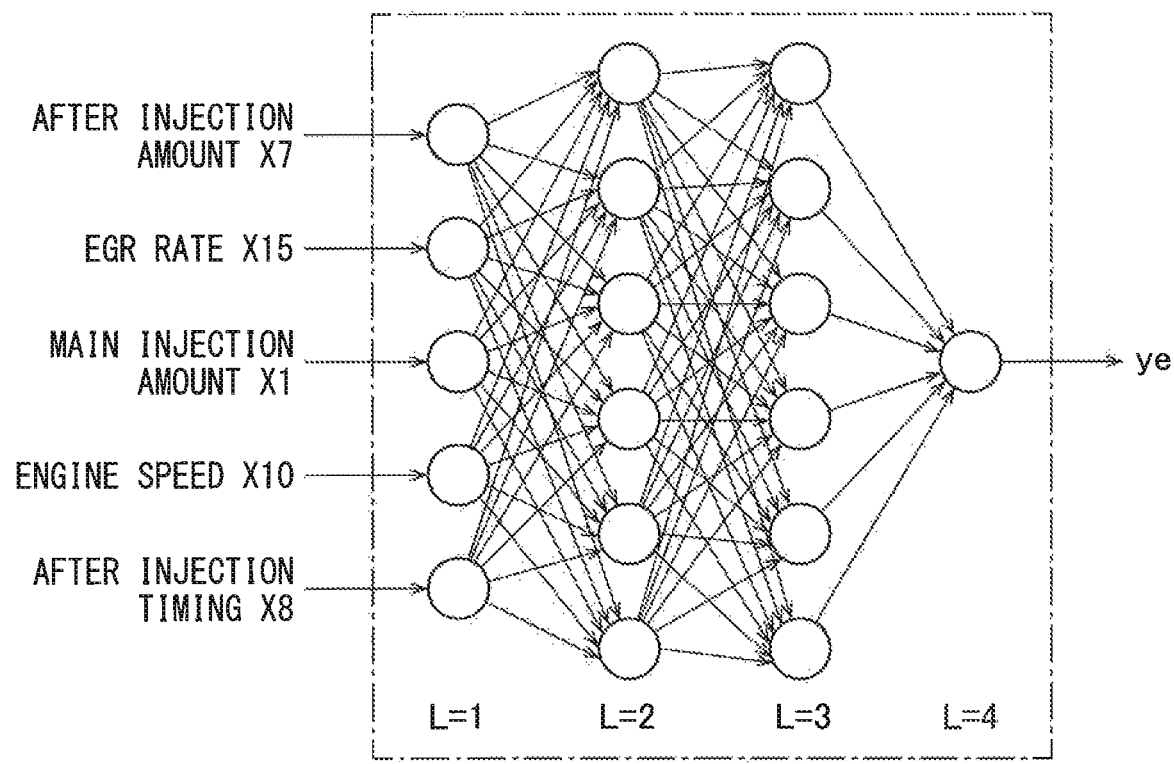
FIG. 15A and FIG. 15B are views showing neural networks.
Figure 15B:
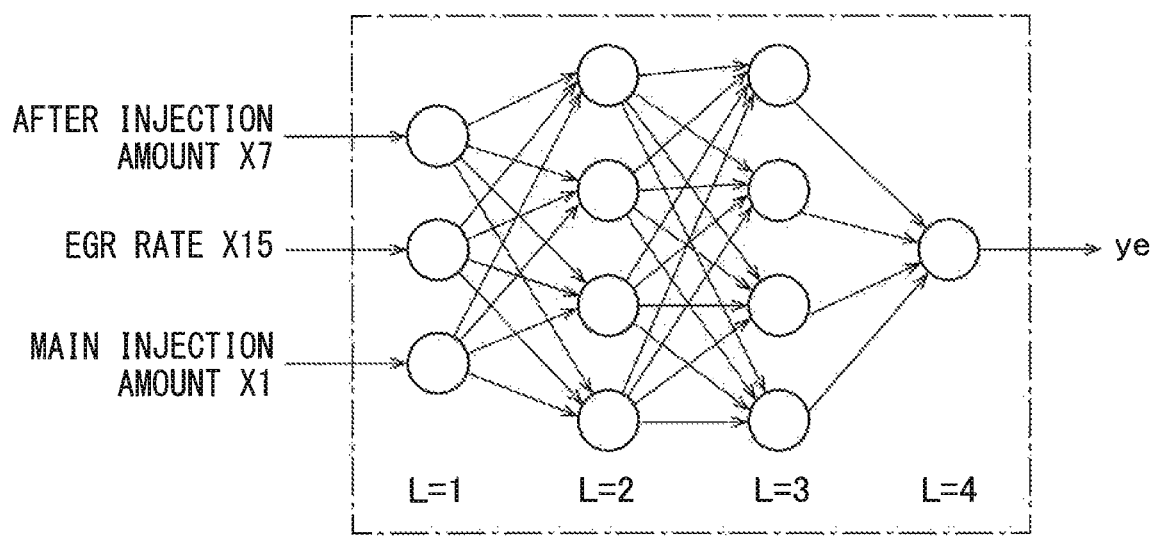
Figure 16:
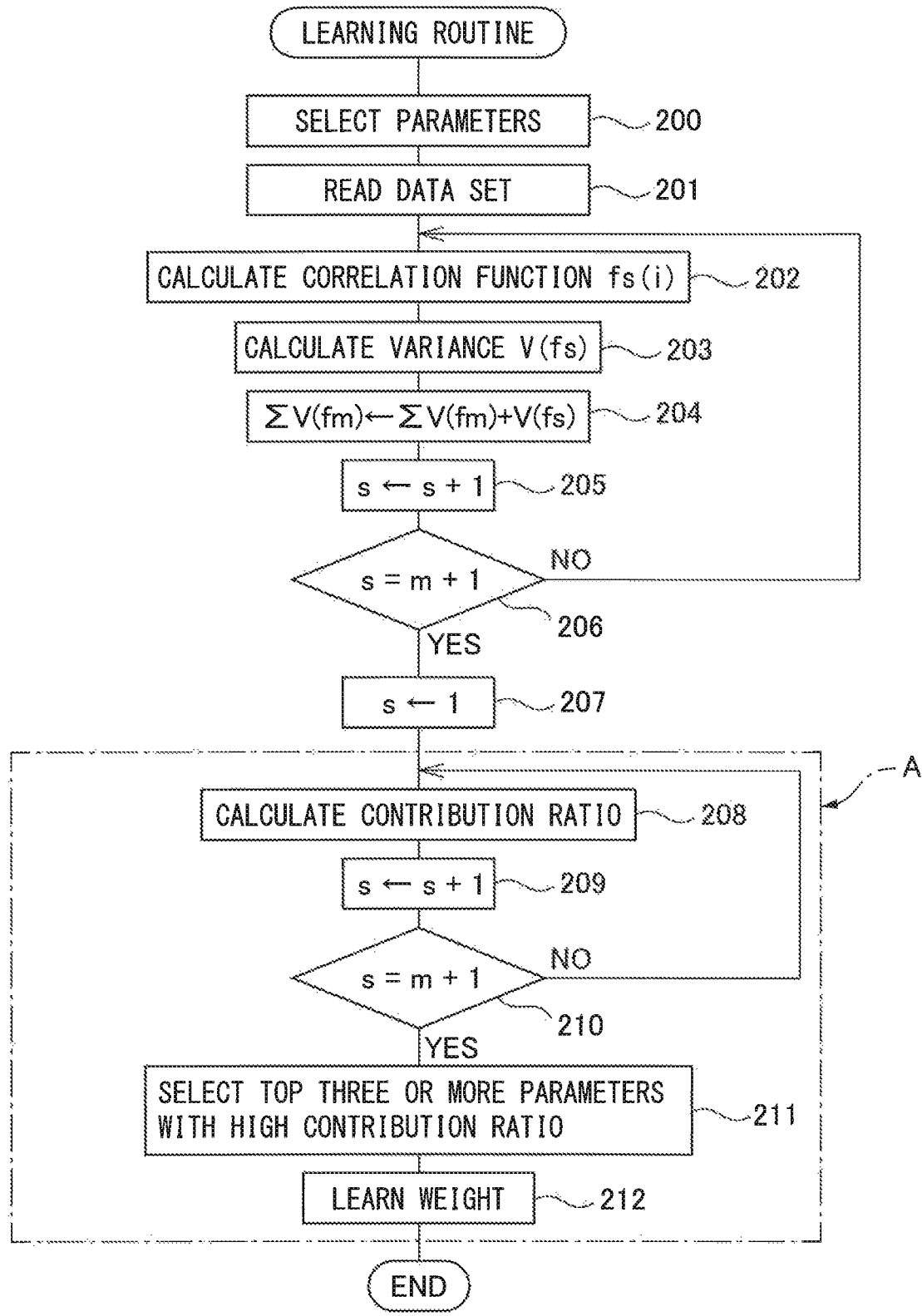
FIG. 16 is a flow chart showing another embodiment of a learning routine.

Next, an embodiment using the contribution ratios of the parameters xs explained with reference to FIG. 12 to select the parameters xs with strong degrees of correlation will be explained. In this embodiment, for example, as the parameters xs with strong degrees of correlation, the top three or more parameters xs with high contribution ratios of the parameters xs are selected, the weights of the neural network are learned by the selected parameters xs, and the learned neural network is used to calculate the estimated value of the amount of unburned fuel "y" using the selected parameter values xs. FIG. 15A and FIG. 15B show neural networks used in this embodiment, while FIG. 16 shows the learning routine for working this embodiment.

Referring to FIG. 15A and FIG. 15B, in the same way as FIG. 4, L=1 shows the input layer, L=2 and L=3 show hidden layers, and L=4 shows the output layer. Note that, in FIG. 15A, the input layer (L=1) is comprised of five nodes, while the hidden layer (L=2) and hidden layer (L=3) are respectively comprised of six nodes, but the number of hidden layers may be one layer or any other number of layers and the number of nodes of the input layer and the number of nodes of the hidden layers may be any numbers. On the other hand, in FIG. 15B, the input layer (L=1) is comprised of three nodes while the hidden layer (L=2) and hidden layer (L=3) are respectively comprised of four nodes, but the number of hidden layers may be one layer or any other number of layers and the number of nodes of the input layer and the number of nodes of the hidden layers may be any numbers. Note that, in this embodiment, in each of the cases shown in FIG. 15A and FIG. 15B as well, the number of nodes of the output layer is made one node.

Next, employing as an example the case of using the data set shown in FIG. 8 for learning, the learning routine shown in FIG. 16 will be explained. Referring to FIG. 16, first, at step 200, the parameters believed to have effects on the amount of unburned fuel are selected. That is, as explained above, an engine is operated under various operating states before shipment to confirm its performance. The values of the various parameters acquired at this time are stored in advance. At step 200, the amount of unburned fuel is selected as the output parameter from among these parameters stored in advance, while "m" number of parameters from No. 1 to No. 16 shown in FIG. 8 are selected as parameters believed to have effects on the amount of unburned fuel.

Next, at step 201, a data set showing the relationship of the selected parameters, that is, the data set shown in FIG. 8, is read in. Next, at step 202, the correlation function fs(i) regarding the parameter xs is calculated from the above formulas (12), (13), and (14). Next, at step 203, the variance V(fs) for the parameter xs is calculated from the above formula (16). Next, at step 204, the variance V(fs) is added to $\Sigma$V(fm) to calculate the sum $\Sigma$V(fm) of the variance. Note that, the initial value of "s" is made 1, so when the routine first proceeds to step 202, the correlation function f1(i) for the parameters x1 is calculated, at step 203, the variance V(f1) for the parameter x1 is calculated, and, at step 204, the variance V(f1) is added to the sum $\Sigma$V(fm) of the variance.

Next, at step 205, "s" is incremented by "1". Next, at step 206, whether "s" becomes m+1, that is, whether the variance V(fs) has been calculated for all of the "m" number of parameters xs, is judged. When "s" does not become m+1, the routine returns to step 202. As opposed to this, when "s" becomes m+1, that is, when it is judged that the variance V(fs) has been calculated for all of the "m" number of parameters xs, the routine proceeds to step 207 where "s" is initialized to "1". Next, the routine proceeds to step 208. At this time, at step 204, the sum $\Sigma$V(fm) of the variance V(fs) has been calculated for all of the "m" number of parameters xs.

At step 208, the contribution ratio of the parameter xs is calculated by using the above formula (17). Next, at step 209, "s" is incremented by "1". Next, at step 210, whether "s" becomes "m+1", that is, whether the contribution ratio has been calculated for all of the "m" number of parameters xs, is judged. When "s" does not become "m+1", the routine returns to step 208. As opposed to this, when "s" becomes "m+1", that is, when it is judged if the contribution ratio has been calculated for all of the "m" number of parameters xs, the routine proceeds to step 211. At step 211, the parameters xs with the top three or more high contribution ratios are selected from among the contribution ratios calculated at step 208. Next, at step 212, the selected parameters xs are used to learn the weights of the neural network.

FIG. 15A shows the case where at step 211, the parameters xs with the top five high contribution ratio, that is, the after injection amount x7, EGR rate x15, main injection amount x1, engine speed x10, and after injection timing x8 (see FIG. 12), are selected. In this case, the after injection amount x7, EGR rate x15, main injection amount x1, engine speed x10, and after injection timing x8 are used to learn the weights of the neural network so that the output value from the output layer (L=4) approaches the actually measured amount of unburned fuel "y". If finishing learning the weights of the neural network, it becomes possible to estimate the amount of unburned fuel "y" by using the neural network whose weights have finished being learned. That is, if the after injection amount x7, EGR rate x15, main injection amount x1, engine speed x10, and after injection timing x8 are input to the input layer (L=1) of the neural network whose weights have finished being learned, the estimated value ye of the amount of unburned fuel is output from the output layer (L=4) of the neural network.

On the other hand, FIG. 15B shows the case where, at step 211, the parameters xs with the top three high contribution ratio, that is, the after injection amount x7, EGR rate x15, and main injection amount x1 (see FIG. 12), are selected. In this case, the after injection amount x7, EGR rate x15, and main injection amount x1 are used to learn the weights of the neural network so that the output value from the output layer (L=4) approaches the actually measured amount of unburned fuel "y". In this case as well, if finishing learning the weight of the neural network, it becomes possible to estimate the amount of unburned fuel "y" by using the neural network whose weights have finished being learned. That is, if the after injection amount $x_7$, EGR rate $x15$, and main injection amount $x1$ are input to the input layer (L=1) of the neural network whose weights have finished being learned, the estimated value ye of the amount of unburned fuel is output from the output layer (L=4) of the neural network.

Next, an embodiment where parameters with the contribution ratios of preset lower limit values or more are selected as parameters with strong degrees of correlation will be explained. This embodiment is performed with the routine part surrounded by the broken line A in the learning routine shown in FIG. 16 replaced with the routine part surrounded by the broken line A in FIG. 17. Step 200 to step 207 are already explained in the learning routine shown in FIG. 16, so the explanation from step 200 to step 207 will be omitted and only step 220 to step 225 shown in FIG. 17 will be explained.

Figure 17:
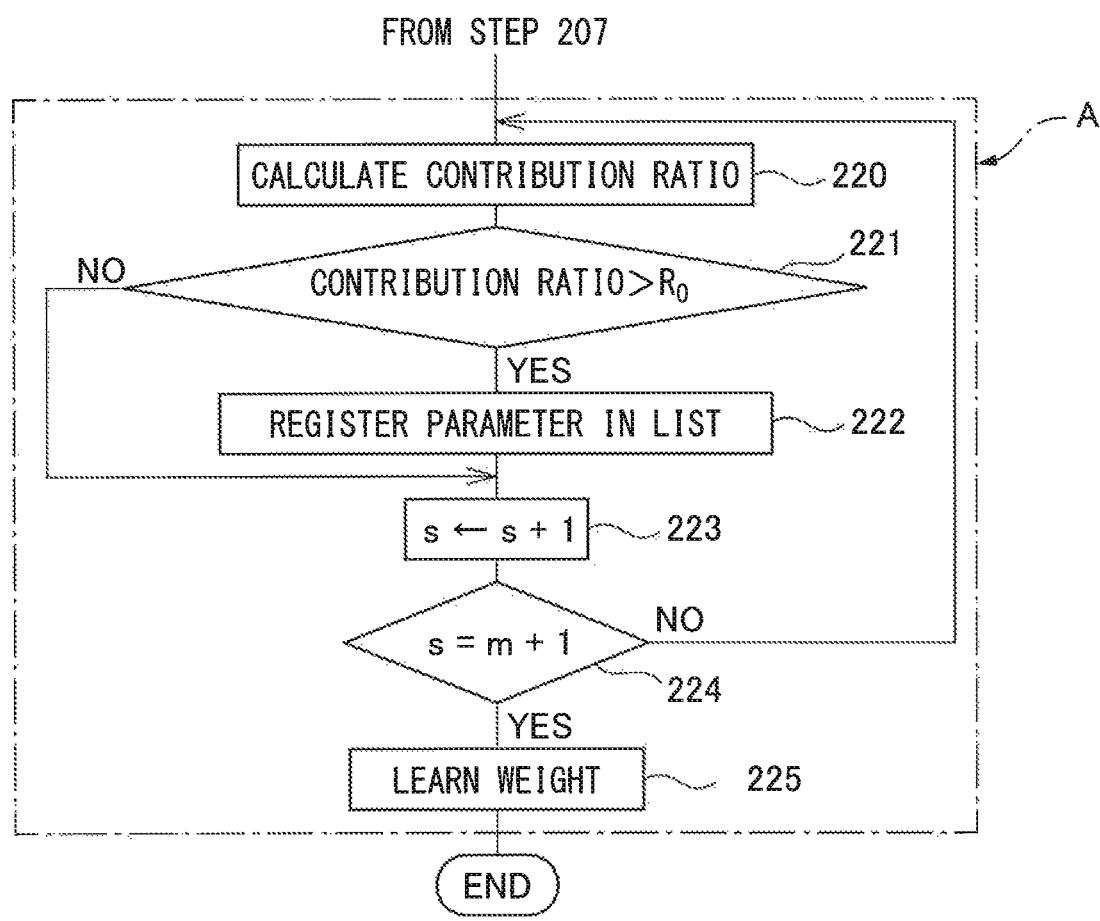
FIG. 17 is a flow chart showing another embodiment of a part surrounded by a broken line A in FIG. 16.

Referring to FIG. 17, at step 220, the contribution ratios of the parameter xs are calculated by using the above formula (17). Next, at step 221, it is judged if the contribution ratio of the parameter xs is larger than a preset lower limit value $R_0$. When the contribution ratio of the parameter xs is larger than the preset lower limit value $R_0$, the routine proceeds to step 222 where the parameter xs is registered as a parameter with the strong degree of correlation in the list stored in the RAM 43 of the electronic control unit 40. Next, the routine proceeds to step 223. As opposed to this, when at step 221 it is judged that the contribution ratio of the parameter xs is not larger than the preset lower limit value $R_0$, the routine jumps to step 223.

At step 223, "s" is incremented by exactly 1. Next, at step 224, it is judged whether "s" becomes "m+1", that is, if the contribution ratio and the preset lower limit value $R_0$ have been compared for all of the "m" number of parameters xs. When "s" does not become "m+1", the routine returns to step 220. As opposed to this, when "s" becomes "m+1", that is, when it is judged that the contribution ratio and the preset lower limit value $R_0$ have been compared for all of the "m" number of parameters xs, the routine proceeds to step 225. At step 225, the parameters registered in the list at step 222, that is, the parameters with the contribution ratio larger than the preset lower limit value $R_0$, are selected as input parameters of the neural network, and these input parameters are used to learn the weights of the neural network.

As the lower limit value $R_0$ used at step 221, it is possible to use the degree of change of the variance due to fluctuation in the actually measured amount of unburned fuel "y", that is, the true amount of unburned fuel "y". That is, even under the same operating states, the true amount of unburned fuel "y" fluctuates due to variations in the dimensions of the engine within the tolerances. In this case, the variance V(y) of the true amount of unburned fuel "y" is expressed as the average value of the sums of squares of the difference between the true amounts of unburned fuel "y" and the average value of the true amounts of unburned fuel "y". Here, for example, if designating the variance of the true amount of unburned fuel "y" in an engine designed so that the dimensions are at the center of the tolerances as "$V(y_0)$" and designating the variance of the true amount of unburned fuel "y" in an engine designed so that the dimensions are the maximum in the tolerances as "$V(y_1)$", the degree of change of the variance V(y) of the true amount of unburned fuel "y" due to the variation in dimensions within the tolerances is expressed by $(V(y_1)-V(y_0))/V(y_0)$. This degree of change of the variance is used as the lower limit value $R_0$. That is, the range of fluctuation of the true amount of unburned fuel "y" due to the variation of dimensions of the engine within the tolerances is used as the lower limit value $R_0$.

Next, an embodiment reselecting the selected parameters based on mounting of a sensor for detecting the parameter value and the cost of the sensor will be explained. This embodiment is performed by replacing the routine part surrounded by the broken line A in the learning routine shown in FIG. 16 with the routine part surrounded by the broken line A in FIG. 18. Step 200 to step 207 are already explained in the learning routine shown in FIG. 16, so the explanation from step 200 to step 207 is omitted and only step 230 to step 237 shown in FIG. 18 will be explained.

Figure 18:
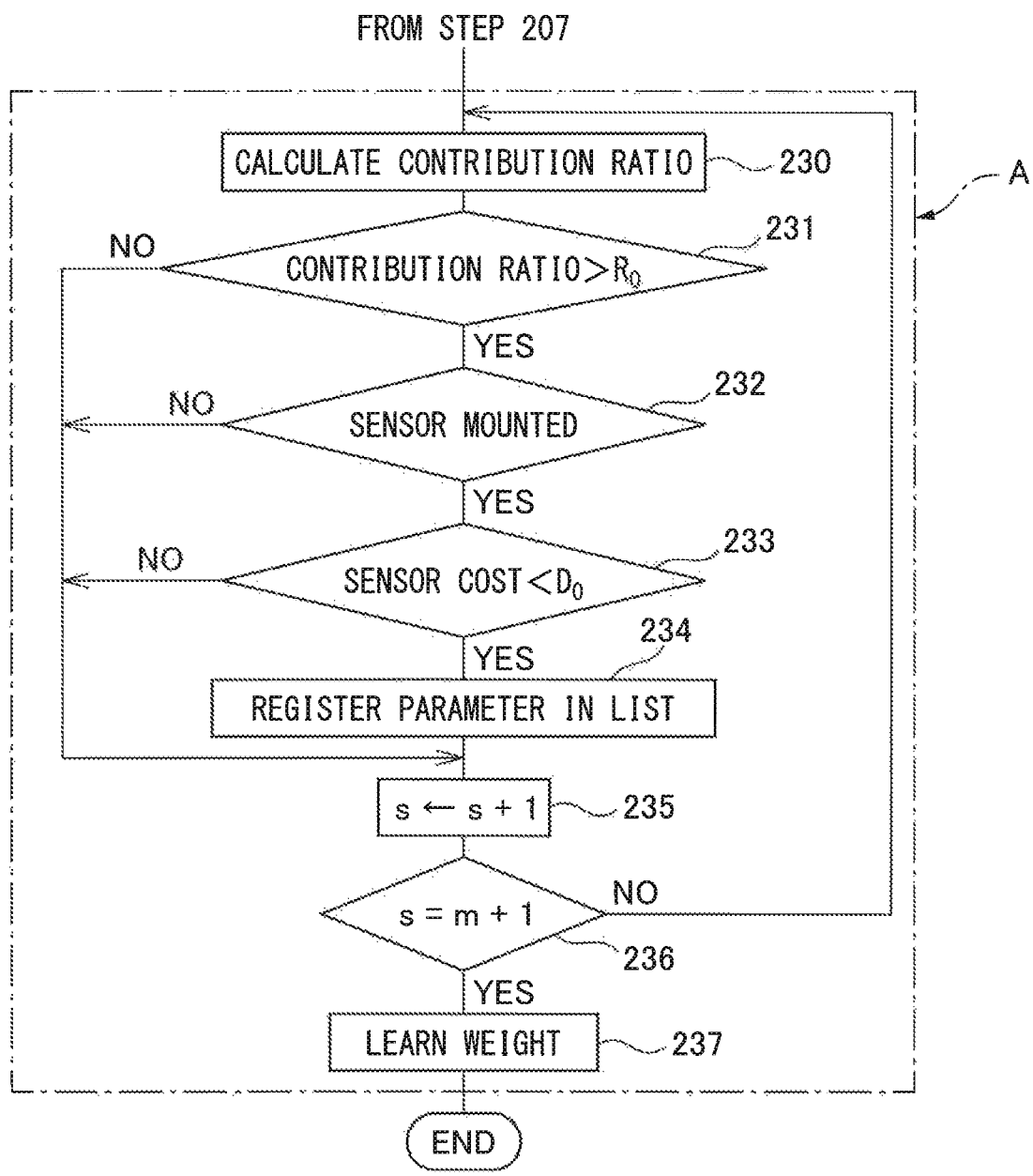
FIG. 18 is a flow chart showing still another embodiment of a part surrounded by a broken line A in FIG. 16.

Referring to FIG. 18, at step 230, the contribution ratios of the parameter xs are calculated by using the above formula (17). Next, at step 231, it is judged if the contribution ratio of the parameter xs is larger than the preset lower limit value $R_0$. When the contribution ratio of the parameter xs is larger than the preset lower limit value $R_0$, the routine proceeds to step 232 where it is judged if a sensor for detecting the parameter value xs will be mounted in a commercially available vehicle. If the sensor for detecting the parameter value xs will be mounted in a commercially available vehicle, the routine proceeds to step 233 where it is judged if the price of the sensor for detecting the parameter value xs, that is, the cost of the sensor, is less than a preset allowable cost $D_0$. When the cost of the sensor for detecting the parameter value xs is less than the preset allowable cost $D_0$, the routine proceeds to step 234 where the parameter xs is registered as a parameter with the strong degree of correlation in the list stored in the RAM 43 of the electronic control unit 40. Next, the routine proceeds to step 235.

As opposed to this, when at step 231 it is judged that the contribution ratio of the parameter xs is not larger than the preset lower limit value $R_0$ or when at step 232 it is judged that a sensor for detecting the parameter value xs will not be mounted in a commercially available vehicle or when at step 233 it is judged that the cost of the sensor for detecting the parameter value xs is the preset allowable cost $D_0$ or more, the routine jumps to step 235. At step 235, "s" is incremented by exactly 1. Next, at step 236, it is judged if "s" becomes "m+l", that is, it is judged if the contribution ratio and the preset lower limit value $R_0$ have been compared for all of the "m" number of parameters xs.

When at step 236 it is judged that "s" does not become "m+1", the routine returns to step 230. As opposed to this, when "s" becomes "m+1", that is, when it is judged that the contribution ratio and the preset lower limit value $R_0$ have been compared for all of the "m" number of parameters xs, the routine proceeds to step 237. At step 237, the parameters registered in the list at step 234 are selected as input parameters of the neural network, and this input parameters are used for learning the weights of the neural network.

That is, in this embodiment, when the contribution ratio of the parameter xs is larger than the preset lower limit value $R_0$ and when a sensor for detecting the parameter value xs will be mounted in a commercially available vehicle, and the cost of the sensor for detecting the parameter value xs is less than a preset allowable cost $D_0$, the parameter xs is reselected as an input parameter of the neural network. In this case, explained another way, when the contribution ratio of the parameter xs is larger than the preset lower limit value $R_0$, the parameter xs is selected as an input parameter of the neural network and, when a sensor for detecting the parameter value xs will be mounted in a commercially available vehicle and the cost of the sensor for detecting the parameter value xs is less than a preset allowable cost $D_0$, the parameter xs is reselected as an input parameter of the neural network.

Next, an embodiment selecting the parameters xs contributing to the cumulative contribution ratio as parameters with strong degrees of contribution when the cumulative contribution ratio, obtained by cumulatively adding the contribution ratio of the parameters xs in order from the highest contribution ratio, reaches a preset upper limit value will be explained. This embodiment is performed by replacing the routine part surrounded by the broken line A in the learning routine shown in FIG. 16 with the routine part surrounded by the broken line A in FIG. 19. Step 200 to step 207 are already explained in the learning routine shown in FIG. 16, so the explanation from step 200 to step 207 will be omitted and only step 240 to step 251 shown in FIG. 19 will be explained.

Figure 19:
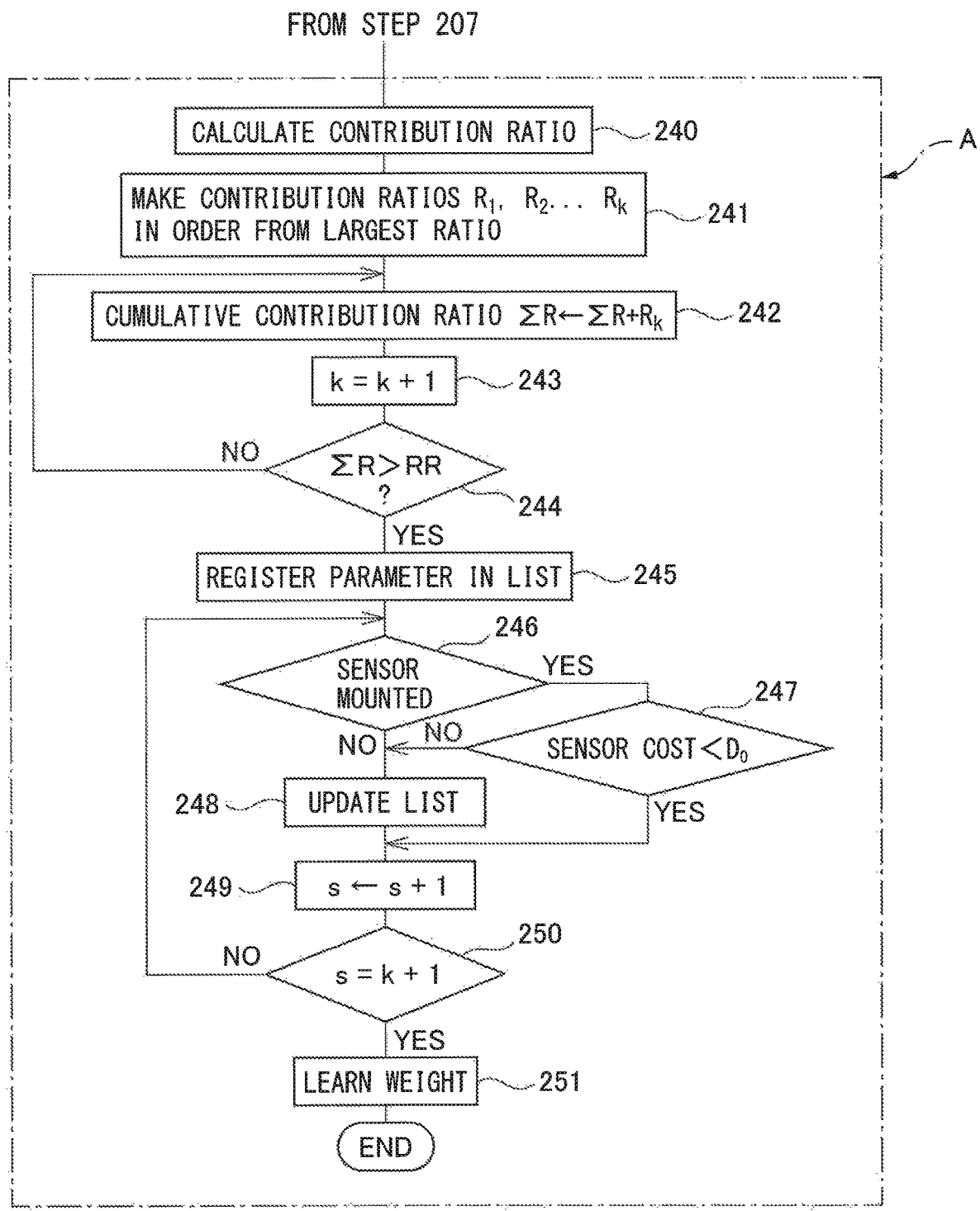
FIG. 19 is a flow chart showing still another embodiment of a part surrounded by a broken line A in FIG. 16.

Referring to FIG. 19, at step 240, the contribution ratios of all of the parameters xs are calculated by using the above formula (17). Next, at step 241, the contribution ratios of the parameters xs are made $R_1, R_2, \ldots R_k, \ldots$ in order from the largest one down. Next, at step 242, the contribution ratio $R_k$ is added to $\Sigma R$ to calculate the cumulative contribution ratio $\Sigma R$. Here, the initial value of "k" is made "1". Therefore, when first proceeding to step 242, the largest contribution ratio $R_1$ is added to $\Sigma R$. Note that, the initial value of the cumulative contribution ratio $\Sigma R$ is zero. Next, at step 243, "k" is incremented by exactly 1. Next, at step 244, it is judged if the cumulative contribution ratio $\Sigma R$ exceeds the preset upper limit value, for example, 0.98. When the cumulative contribution $\Sigma R$ does not exceed the preset upper limit value, the routine returns to step 242.

When the routine first returns to step 242, the second largest contribution ratio $R_2$ is added to the cumulative contribution ratio $\Sigma R$. Next, at step 242, the contribution ratio $R_k$ continues to be added to the cumulative contribution ratio $\Sigma R$ in order from the largest ratio down until it is judged at step 244 that the cumulative contribution ratio $\Sigma R$ exceeds the preset upper limit value. Next, if it is judged at step 244 that the cumulative contribution ratio $\Sigma R$ exceeds the preset upper limit value, the routine proceeds to step 245 where the parameters xs contributing to the cumulative contribution ratio $\Sigma R$ are registered in the list stored in the RAM 43 of the electronic control unit 40 as parameters with strong degrees of correlation. Next, the routine proceeds to step 246. The parameters xs registered in the list at this time are "k" number of parameters with the contribution ratio $R_k$ larger than the contribution ratio $R_k$ of the remaining parameters xs which were not registered in the list.

At step 246 to step 250, the selected parameters are reselected based on mounting of any sensor for detecting the parameter value and the cost of the sensor for the parameters xs registered in the list. That is, at step 246, it is judged if a sensor for detecting the parameter value xs registered in the list will be mounted in a commercially available vehicle. If a sensor for detecting the parameter value xs will be mounted in a commercially available vehicle, the routine proceeds to step 247 where it is judged if the cost of the sensor for detecting the parameter value xs is less than a preset allowable cost $D_0$. When the cost of the sensor for detecting the parameter value xs is less than the predetermined allowable cost $D_0$, the routine proceeds to step 249.

As opposed to this, when at step 246 it is judged that a sensor for detecting a parameter value xs will not be mounted in a commercially available vehicle or when at step 247 it is judged that the cost of a sensor for detecting the parameter value xs is the preset allowable cost $D_0$ or more, the routine proceeds to step 248 where the parameter xs covered by these judgments is deleted from the parameters xs registered at the list. That is, the list is updated. Next, the routine proceeds to step 249. At step 249, "s" is incremented by exactly 1. Next, at step 250, it is judged whether "s" becomes "k+1", that is, whether the judgment relating to mounting of a sensor and judgment relating to the cost of the sensor have been performed for all of the "k" number of parameters xs registered in the list at step 245.

When it is judged at step 250 that "s" does not become "k+1", the routine returns to step 246. As opposed to this, when "s" becomes "k+1", that is, when it is judged at step 245 that judgment relating to mounting of a sensor and judgment relating to the cost of the sensor have been performed for all of the "k" number of parameters xs registered in the list, the routine proceeds to step 251. At step 251, the parameters registered in the list updated at step 248 are selected as input parameters of the neural network, and these input parameters are used to learn the weights of the neural network.

Figure 20:
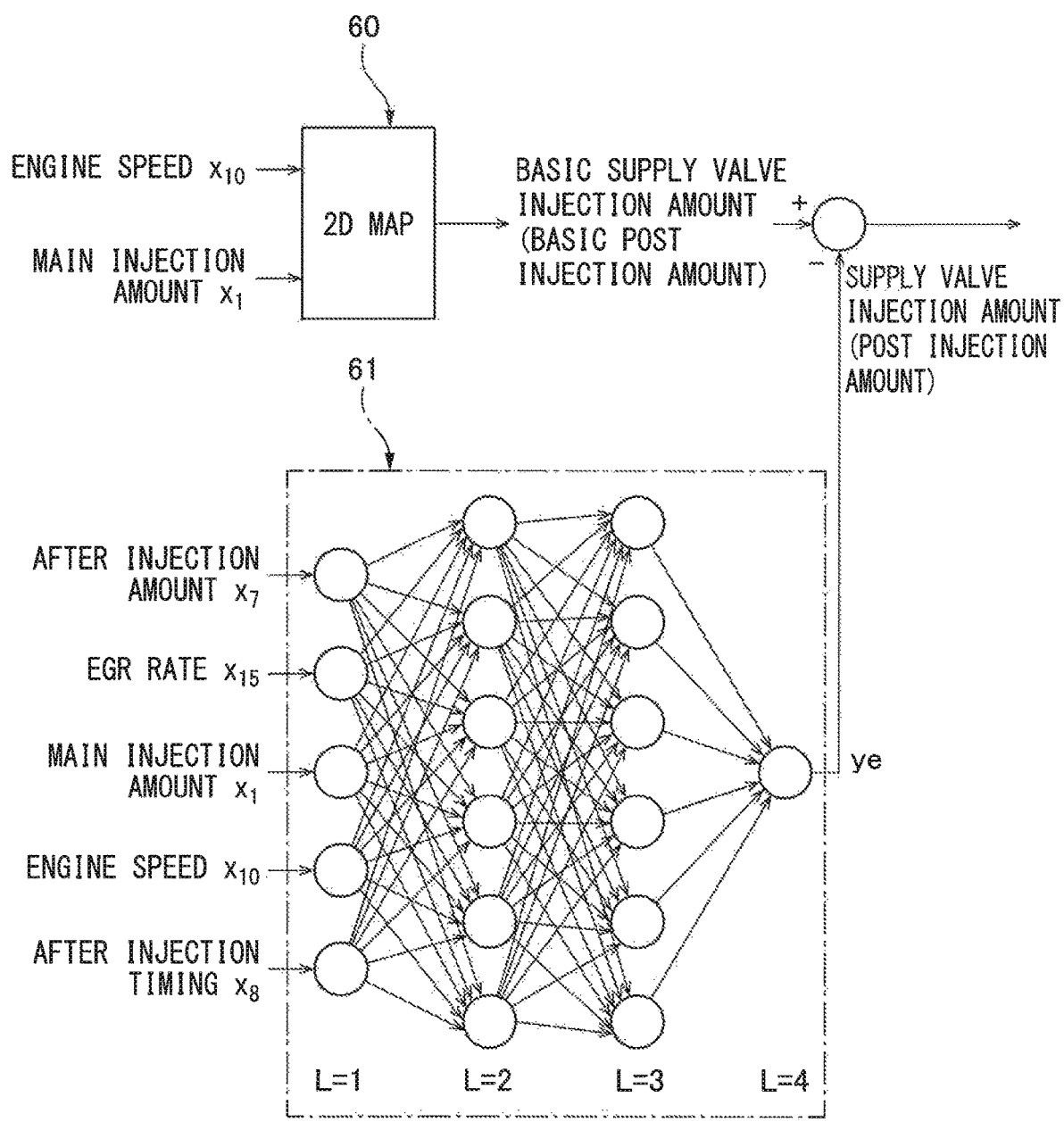
FIG. 20 is a view showing a functional block diagram of injection amount control.

Now then, in the embodiment according to the present invention, the fuel injection amount from the fuel supply valve 24 arranged in the exhaust manifold 5 is controlled to control the amount of unburned fuel flowing into the catalytic converter 14. FIG. 20 shows a functional block diagram of control of the injection amount from the fuel supply valve 24. As shown in FIG. 20, in this embodiment, a 2D (two-dimensional) map 60 for calculating the basic injection amount from the fuel supply valve 24 and the neural network 61 for outputting the estimated value ye of the amount of unburned fuel exhausted from the combustion chambers 2 are used. In this case, in this embodiment according to the present invention, the basic injection amount from the fuel supply valve 24 required for making the amount of unburned fuel flowing into the catalytic converter 14 the target amount of unburned fuel is found in advance by experiments, and this basic injection amount from the fuel supply valve 24, as shown in FIG. 20, is stored as a function of the engine speed x10 and main injection amount x1 in the form of the two-dimensional map 60 in advance in the ROM 42 of the electronic control unit 40.

Note that, in this case, instead of fuel injection from the fuel supply valve 24, it is also possible to use the post injection from the fuel injectors 3. In this case, the basic post injection amount from the fuel injectors 3 required for making the amount of unburned fuel flowing into the catalytic converter 14 the target amount of unburned fuel is found in advance by experiments, and this basic post injection amount from the fuel injectors 3 is stored as a function of the engine speed x10 and main injection amount x1 in the form of a two-dimensional map in advance in the ROM 42 of the electronic control unit 40.

In this regard, the neural network 61 shown in FIG. 20 shows a learned neural network using the parameters xs with the top five high contribution ratios, that is, the after injection amount x7, EGR rate x15, main injection amount x1, engine speed x10, and after injection timing x8 (see FIG. 12), as input parameters and learned in weights of the neural network so that the output value "y" of the neural network approaches the actual measured value of the amount of unburned fuel exhausted from the combustion chambers 2. This neural network 61 is stored in the ROM 42 or RAM 42 of the electronic control unit 40. Note that, in this embodiment according to the present invention, the weights of this neural network are learned before shipment of the vehicle, but the weights of the neural network can also be learned on-board.

On the other hand, when using this neural network 61 to estimate the amount of unburned fuel exhausted from the combustion chambers 2, as shown in FIG. 20, the parameters xs with the top five high contribution ratios, that is, the after injection amount x7, EGR rate x15, main injection amount x1, engine speed x10, and after injection timing x8 (see FIG. 12), are input to the input layer (L=1) of the neural network 61. At this time, the estimated value ye of the amount of unburned fuel exhausted from the combustion chambers 2 is output from the neural network 61. Next, as shown in FIG. 20, the estimated value ye of the amount of unburned fuel output from the neural network 61 is subtracted from the basic injection amount from the fuel supply valve 24 calculated from the two-dimensional map 60, then the fuel reduced in amount by exactly the estimated value ye of the amount of unburned fuel is injected from the fuel supply valve 24.

Figure 21:
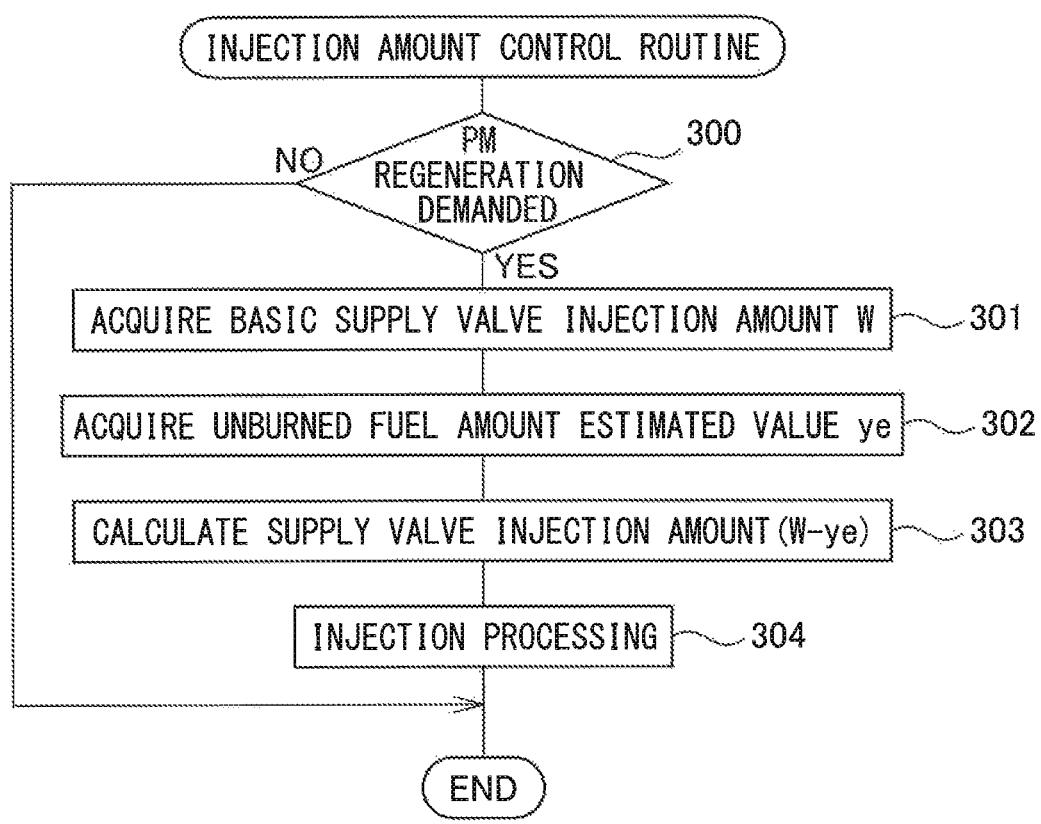
FIG. 21 is a flow chart showing an injection amount control routine.

FIG. 21 shows an injection amount control routine for controlling the injection amount from the fuel supply valve 24. Referring to FIG. 21, first, at step 300, whether a demand for PM regeneration for burning off the particulate deposited on the particulate filter 16 is issued is judged. When the demand for PM regeneration is not issued, the processing cycle is ended. As opposed to this, when the demand for PM regeneration is issued, the routine proceeds to step 301 where the basic injection amount W from the fuel supply valve 24 is calculated from the two-dimensional map 60 based on the engine speed x10 and main injection amount x1.

Next, at step 302, the estimated value ye of the amount of unburned fuel output from the neural network 61 is read in. Next, at step 303, a value (W−ye) obtained by subtracting the estimated value ye of the amount of unburned fuel from the basic injection amount W fed from the fuel supply valve 24 is calculated. This value (W−ye) expresses the injection amount from the fuel supply valve 24 required for making the amount of unburned fuel flowing into the catalytic converter 14 the target amount of unburned fuel. Next, at step 303, fuel is injected from the fuel supply valves 24 by the injection amount (W−ye). As a result, the fuel required for making the amount of unburned fuel flowing to the inside of the catalytic converter 14 the target amount of unburned fuel is injected from the fuel supply valve 24.

Figure 22A:
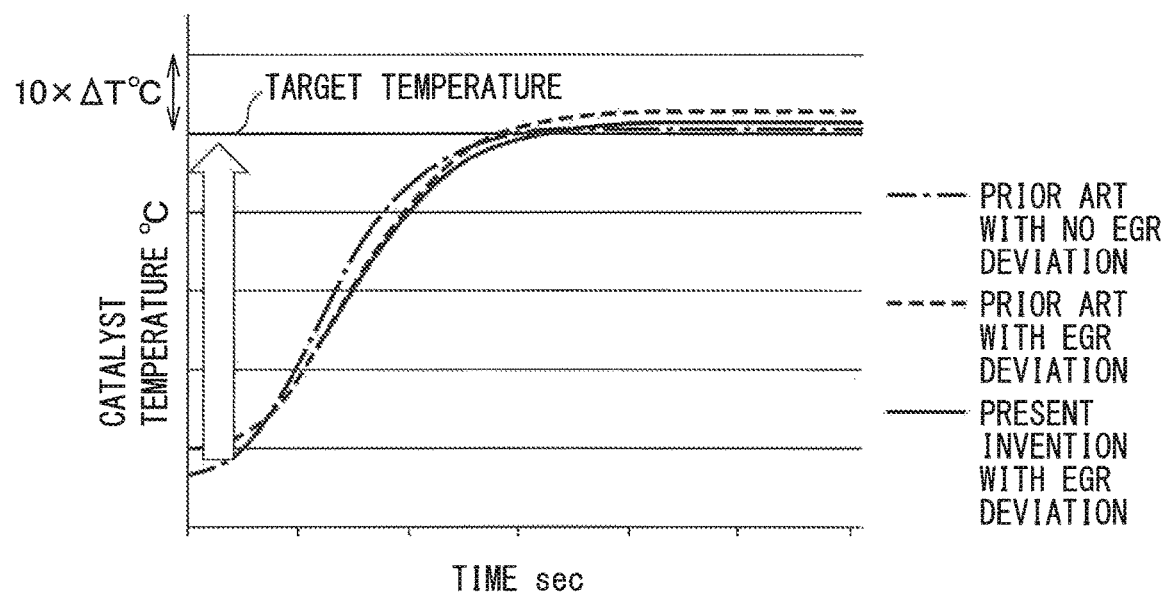
FIG. 22A and FIG. 22B are views showing changes in temperature of a catalyst.
Figure 22B:
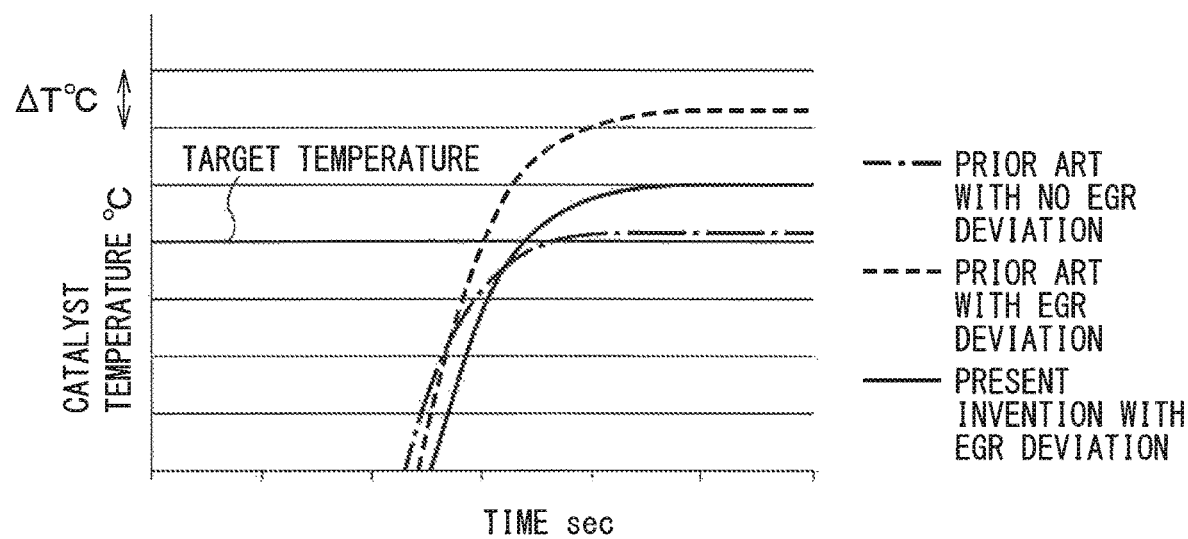

FIG. 22A and FIG. 22B shows the test results in the case of controlling the injection amount from the fuel supply valve 24 so that the amount of unburned fuel flowing into the catalytic converter 14 becomes the target amount of unburned fuel at the time of regeneration of the particulate filter 16. Note that, FIG. 22B, compared with FIG. 22A, shows the temperature T of the particulate filter 16, that is, the catalyst temperature T, enlarged 10-fold. Further, in FIG. 22A and FIG. 22B, the solid line shows the case where the injection amount control according to the present invention shown in FIG. 20 and FIG. 21 is performed when the amount of EGR gas deviates from the target EGR gas amount, the broken line shows the case where the injection amount control according to the prior art is performed when the amount of EGR gas deviates from the target EGR gas amount, and the dot-dash line shows the case where the injection amount control according to the prior art is performed when the amount of EGR gas does not deviate from the target EGR gas amount.

As will be understood from FIG. 22B, if the amount of EGR gas does not deviated from the target EGR gas amount, even in the prior art, the temperature T of the particulate filter 16 reaches substantially the target temperature as shown by the dot-dash line. On the other hand, if the amount of EGR gas deviates from the target EGR gas amount, in the prior art, the temperature T of the particulate filter 16 ends up greatly exceeding the target temperature as shown by the broken line. As opposed to this, even if the amount of EGR gas deviates from the target EGR gas amount, if the injection amount control according to the present invention shown in FIG. 20 and FIG. 21 is performed, the temperature T of the particulate filter 16, as shown by the solid line, just slightly exceeds the target temperature. In this regard, the amount of EGR gas often deviates from the target EGR gas amount. Therefore, using the injection amount control according to the present invention can be said to enable making the temperature T of the particulate filter 16 approach the target temperature.

Figure 23:
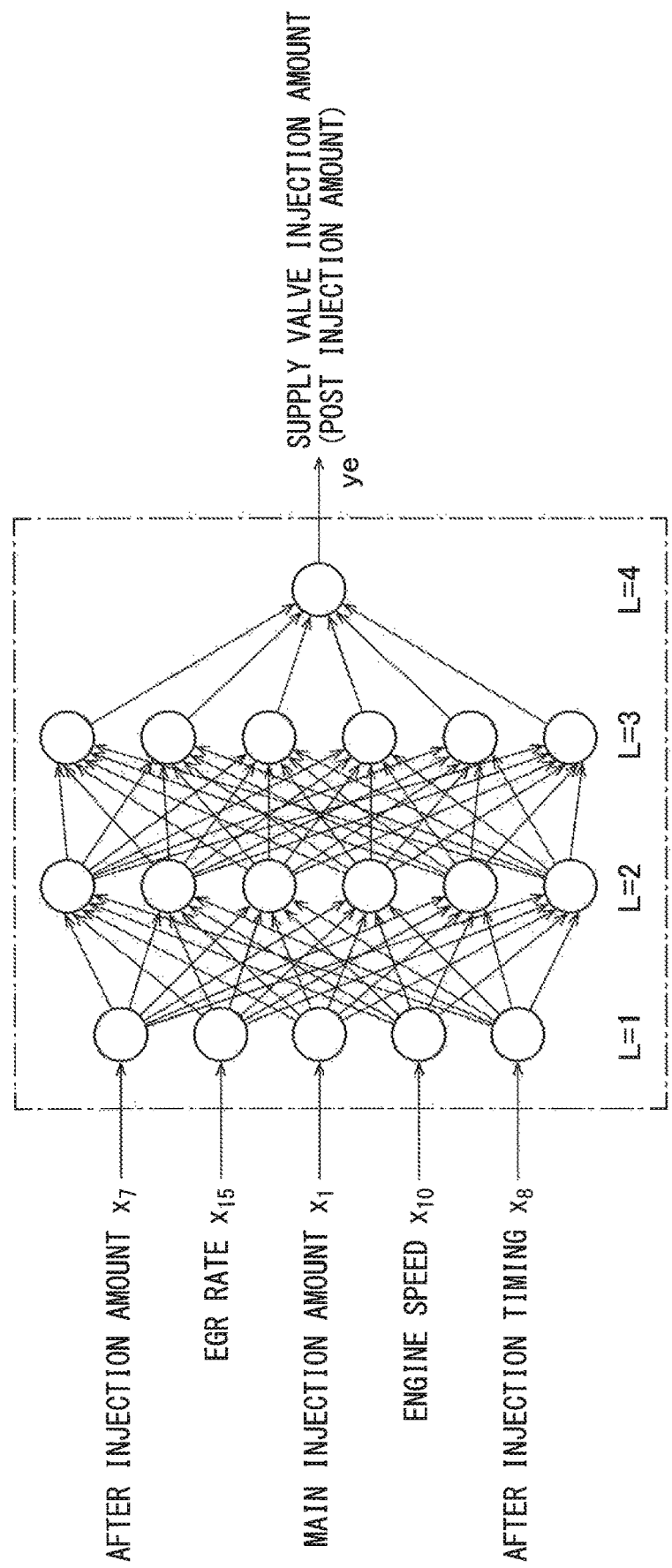
FIG. 23 is a view showing a functional block diagram of another embodiment of injection amount control.

FIG. 23 shows a modification designed so as to control the injection amount from the fuel supply valve 24 so that when regenerating the particulate filter 16, the amount of unburned fuel flowing into the catalytic converter 14 becomes the target amount of unburned fuel without using the two-dimensional map 60 shown in FIG. 20. In this modification, in the data set shown in FIG. 8, as the output parameter, instead of the amount of unburned fuel "y", the injection amount "y" from the fuel supply valve 24 is used, while the parameters xs with the high contribution ratios are used as input parameters to learn the weights of the neural network shown in FIG. 23 so that the injection amount "y" approaches the target amount of unburned fuel.

On the other hand, when using a neural network to estimate the injection amount from the fuel supply valve 24, as shown in FIG. 23, in this modification as well, for example, the parameters xs with the top five high contribution ratios, that is, the after injection amount x7, EGR rate x15, main injection amount x1, engine speed x10, and after injection timing x8 (see FIG. 12), are input to the input layer of the neural network (L=1). At this time, from the neural network, the estimated value ye of the injection amount from the fuel supply valve 24 is output, and fuel is injected from the fuel supply valve 24 by this estimated value ye.

Now then, in the embodiment according to the present invention, as shown in FIG. 14, FIG. 16, FIG. 17, FIG. 18, and FIG. 19, the parameters with strong degrees of correlation with the amount of unburned fuel exhausted from the engine are selected from among the parameters related to the operation of the internal combustion engine, and a learned model for estimating the amount of unburned fuel from the selected parameters and amount of unburned fuel is generated by using a neural network.

In this case, in the embodiment according to the present invention, this learned model is comprised of a learned model which generated by selecting the parameters with strong degrees of correlation with the amount of unburned fuel exhausted from the internal combustion engine from among the parameters related to the operation of the engine, that is, the common rail pressure detected by the fuel pressure sensor 30, the intake pressure inside of the intake manifold 4 detected by the intake pressure sensor 25, the intake temperature inside of the intake manifold 4 detected by the intake temperature sensor 26, the engine cooling water temperature detected by the water temperature sensor 29, the exhaust pressure detected by the exhaust pressure sensor 27, the swirl ratio acquired from the demanded opening degree of the swirl control valve 36, and the main injection amount, main injection timing, first pilot injection amount, first pilot injection timing, second pilot injection amount, second pilot injection timing, after injection amount, after injection timing, engine speed, and EGR rate acquired from the command values or calculated values generated at the electronic control unit (ECU) 40, and learning weights of the neural network based on a data set showing the relationship of the selected parameters and the amount of unburned fuel by using the selected parameters as input parameters of the neural network and using the amount of unburned fuel as training data.

On the other hand, in the embodiment according to the present invention, this learned model is built into the electronic control unit 40. In this case, in this embodiment according to the present invention, this electronic control unit is comprised of an electronic control unit which has built into it a learned model which is generated by selecting parameters with strong degrees of correlation with the amount of unburned fuel exhausted from an internal combustion engine from among the above mentioned parameters related to the operation of the engine, and learning weights of the neural network based on a data set showing the relationship of the selected parameters and the amount of unburned fuel by using the selected parameters as input parameters of the neural network and using the amount of unburned fuel as training data.

On the other hand, in producing the electronic control unit 40, it is possible to build a learned neural network into it as a learned model. Therefore, in the embodiment according to the present invention, as the method of production of an electronic control unit, use is made of a method of production of an electronic control unit for producing an electronic control unit by incorporating a learned neural network inside it, in which the learned neural network is generated by selecting parameters with strong degrees of correlation with the amount of unburned fuel exhausted from an internal combustion engine from among the above mentioned parameters related to the operation of the engine, and learning weights of the neural network based on a data set showing the relationship of the selected parameters and the amount of unburned fuel by using the selected parameters as input parameters of the neural network and using the amount of unburned fuel as training data.

Figure 24:
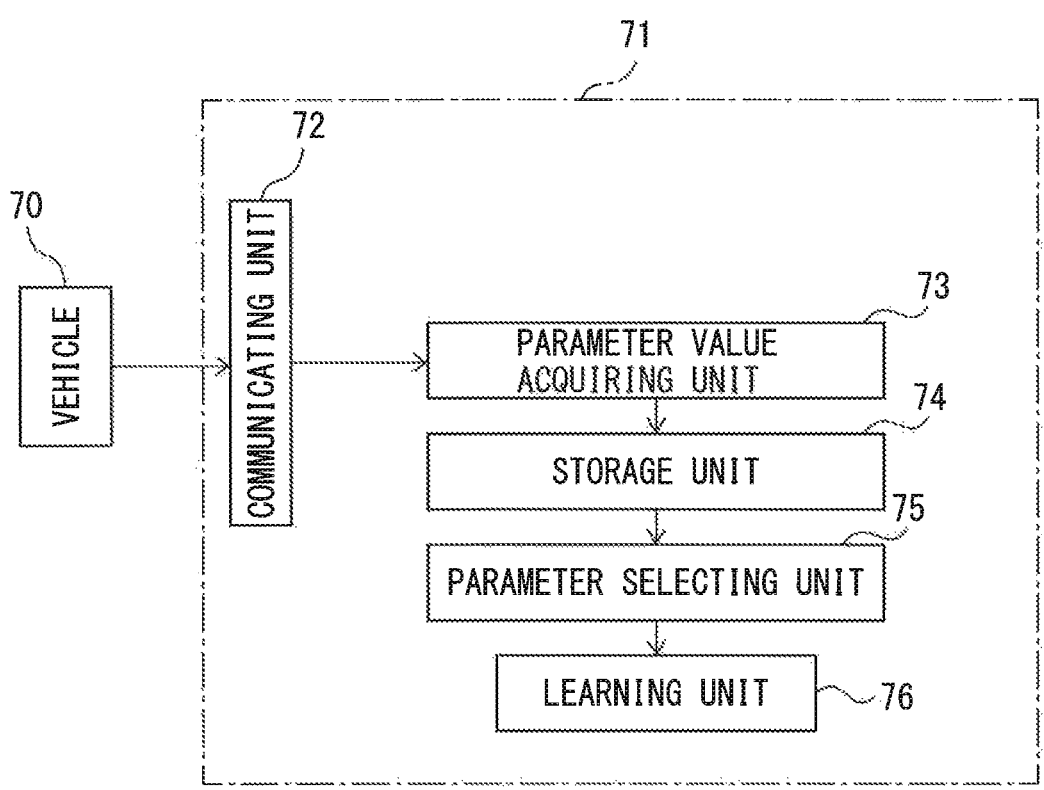
FIG. 24 is a functional block diagram showing still another embodiment according to the present invention.

On the other hand, FIG. 24 is an overview of one example of a machine learning system for predicting an amount of unburned fuel exhausted from an engine. Referring to FIG. 24, 70 shows a vehicle, while 71 shows a server installed outside of the vehicle 70. In this vehicle 70, the common rail pressure, intake pressure inside of the intake manifold 4, intake temperature inside of the intake manifold 4, engine cooling water temperature, exhaust pressure, swirl ratio, main injection amount, main injection timing, first pilot injection amount, first pilot injection timing, second pilot injection amount, second pilot injection timing, after injection amount, after injection timing, engine speed and EGR rate, and amount of unburned fuel exhausted from the engine are found based on the fuel pressure sensor 30, intake pressure sensor 25, intake temperature sensor 26, water temperature sensor 29, exhaust pressure sensor 27, demanded opening degree of the swirl control valve 36, command value or calculated value generated in the electronic control unit (ECU) 40, and HC concentration sensor 31 or gas analysis device.

On the other hand, the server 71, as shown in FIG. 24, comprises a communicating unit 72 for communicating with the vehicle 71, a parameter value acquiring unit 73 for acquiring from the vehicle 70 through the communicating unit 72 parameter values comprised of the common rail pressure, intake pressure inside of the intake manifold 4, intake temperature inside of the intake manifold 4, engine cooling water temperature, exhaust pressure, swirl ratio, main injection amount, main injection timing, first pilot injection amount, first pilot injection timing, second pilot injection amount, second pilot injection timing, after injection amount, after injection timing, engine speed, EGR rate and the amount of unburned fuel exhausted from the engine, a storage unit 74 for storing a data set showing the relationship between the parameters acquired by the parameter value acquiring unit 73 and the acquired amount of unburned fuel, a parameter selecting unit 75 for selecting parameters with strong degrees of correlation with the amount of unburned fuel from among the parameters stored in the data set, and a learning unit 76 for learning the weights of the neural network from the selected parameters and amount of unburned fuel.

That is, this machine learning system for predicting the amount of unburned fuel exhausted from the engine comprises the parameter value acquiring unit for acquiring the amount of unburned fuel exhausted from the engine and parameters relating to the amount of unburned fuel, the storage unit for storing the data set showing the relationship between the parameters and amount of unburned fuel which are acquired by the parameter value acquiring unit, the parameter selecting unit for selecting parameters with strong degrees of correlation with the amount of unburned fuel from among the parameters stored in the data set, and the learning unit for learning weights of the neural network from the selected parameters and amount of unburned fuel.

In this machine learning system, the data relating to the amount of unburned fuel exhausted from the engine and the parameters related to the amount of unburned fuel, which are acquired at the vehicle 70, are received by the communicating unit 72 of the server 71, the data set showing the relationship between the received amount of unburned fuel and the received parameters related to the amount of unburned fuel are stored, the parameters with strong degrees of correlation with the amount of unburned fuel are selected from the parameters stored in the data set, and the weights of the neural network are learned from the selected parameters and amount of unburned fuel.

Figure 25:
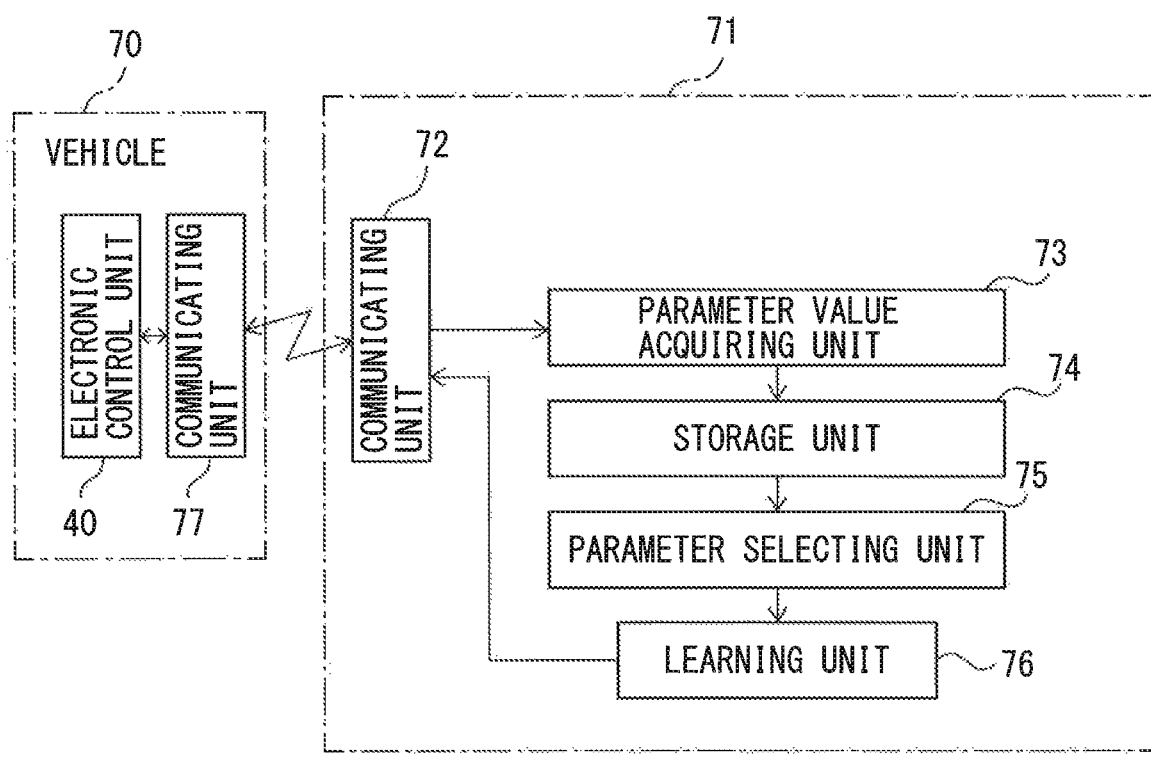
FIG. 25 is a functional block diagram showing still another embodiment according to the present invention.

On the other hand, FIG. 25 shows an overview of another example of a machine learning system for predicting the amount of unburned fuel exhausted from the engine. In this example as well, in the same way as FIG. 24, 70 indicates a vehicle, while 71 indicates a server installed outside of the vehicle 70. This server 71 also, in the same way as the server 71 shown in FIG. 24, comprises a communicating unit 72 for communicating with the vehicle 70, a parameter value acquiring unit 73 for acquiring from the vehicle 70 through the communicating unit 72 parameter values comprised of the common rail pressure, intake pressure inside of the intake manifold 4, intake temperature inside of the intake manifold 4, engine cooling water temperature, exhaust pressure, swirl ratio, main injection amount, main injection timing, first pilot injection amount, first pilot injection timing, second pilot injection amount, second pilot injection timing, after injection amount, after injection timing, engine speed, EGR rate and the amount of unburned fuel exhausted from the engine, a storage unit 74 for storing a data set showing the relationship between the parameters and amount of unburned fuel which are acquired by the parameter value acquiring unit 73, a parameter selecting unit 75 for selecting parameters with strong degrees of correlation with the amount of unburned fuel from among the parameters stored in the data set, and a learning unit 76 for learning the weights of the neural network from the selected parameters and amount of unburned fuel.

On the other hand, in this example, the vehicle 70 comprises a communicating unit 77 communicating with the server 71 in addition to the vehicle-mounted electronic control unit 40. In this example as well, the data relating to the amount of unburned fuel exhausted from the engine and the parameters relating to the amount of unburned fuel, which are acquired in the vehicle 70, are received by the communicating unit 72 of the server 71, a data set showing the relationship between the received amount of unburned fuel and the received parameters relating to the amount of unburned fuel are stored, the parameters with strong degrees of correlation with the amount of unburned fuel are selected from among the parameters stored in the data set, and the weights of the neural network are learned, that is, the amount of unburned fuel exhausted from the engine is learned, from the selected parameters and amount of unburned fuel. Next, the learned model of the amount of unburned fuel exhausted from the engine is transmitted from the communicating unit 72 of the server 71 to the communicating unit 77 of the vehicle 70, and the weights of the neural network in the vehicle-mounted electronic control unit 40 are updated by the learned model received at the communicating unit 77.

That is, in this example, the vehicle-mounted electronic control unit 40 is a vehicle-mounted electronic control unit in which the data showing the amount of unburned fuel exhausted from the engine and the values of parameters relating to the amount of unburned fuel are acquired in the vehicle 70, this data is transmitted to the server 71, the parameters with strong degrees of correlation with the amount of unburned fuel exhausted from the engine are selected from among the received parameters at the server 71, a learned model is generated in the server 71 by using the selected parameters and amount of unburned fuel to learn weights of a neural network, the generated learned model is transmitted to the vehicle 70, and the amount of unburned fuel is predicted by using the learned model from the acquired parameters in the vehicle 70. In this case, the server 71 comprises the parameter value acquiring unit 73 for acquiring the amount of unburned fuel exhausted from the engine and the parameters relating to the amount of unburned fuel, the storage unit 74 for storing a data set showing the relationship between the parameters and amount of unburned fuel which are acquired by the parameter value acquiring unit 73, the parameter selecting unit 75 for selecting parameters with strong degrees of correlation with the amount of unburned fuel from among the parameters stored in the data set, and the learning unit 76 for learning weights of the neural network from the selected parameters and amount of unburned fuel.

The present machine learning handles output forming a continuous value as a problem of regression, but the output may also be considered as a problem of classification of a finite number of discrete categories (multiclass classification). Specifically, it is sufficient to prepare several classes as output and link the classes and the temperatures of the catalyst.

Further, in machine learning, there are various methods for supervised learning besides a neural network such as the Random forest, support vector machine, and k neighbor algorithm. These models are common on the point of being algorithms which lay boundary lines in feature spaces laid by feature vectors and efficiently find the decision boundaries. That is, if possible to be estimated by a neural network, machine learning is possible by other supervised learning models as well.

Further, as machine learning, instead of using supervised learning, it is also possible to use semi supervised learning.

The invention claimed is:

1. A machine learning device configured for estimating an amount of unburned fuel by performing a machine learning function using training data, the machine learning device comprising an electronic control unit configured to receive signals from one or more sensors associated with an internal combustion engine, retrieve parameters relating to operation of the internal combustion engine, the training data, and control programs from a memory, and execute the control programs to perform the machine learning function, wherein the machine learning function comprises:
   selecting first parameters having effects on the amount of unburned fuel exhausted from the internal combustion engine from among the parameters relating to operation of the internal combustion engine,
   calculating the amount of unburned fuel based on the selected first parameters,
   determining a correlation function showing a correlation between each of the selected first parameters and the amount of unburned fuel, wherein said correlation function comprises a linear function showing a relation between values of the selected first parameters and the amount of unburned fuel calculated using the least squares method,
   calculating a variance of the amount of unburned fuel from an average value of the amount of unburned fuel and said linear function, and
   selecting second parameters with strong degrees of correlation with the amount of unburned fuel exhausted from the internal combustion engine from among the selected first parameters based on said variance.

2. The machine learning device according to claim 1, wherein the machine learning function further comprises:
   calculating contribution ratios of the selected first parameters based on said variance, wherein the second parameters are selected based on said contribution ratios.

3. The machine learning device according to claim 2, wherein the selected second parameters are a group of the parameters with the highest contribution ratios.

4. The machine learning device according to claim 2, wherein the selected second parameters are the parameters with contribution ratios greater than a preset lower limit value.

5. The machine learning device according to claim 4, wherein a degree of change of said variance caused by a fluctuation in a true amount of unburned fuel is set as the lower limit value.

6. The machine learning device according to claim 2, wherein the machine learning function further comprises:
   determining a cumulative contribution ratio by cumulatively adding the contribution ratios in order from the highest contribution ratio of a parameter that reaches a preset upper limit value, wherein the parameters contributing to the cumulative contribution ratio are selected as the second parameters.

7. The machine learning device according to claim 1, wherein the selected second parameters are based on a mounting of any sensor for detecting the parameter value and a cost of the sensor.

* * * * *